(12) United States Patent
Takizawa

(10) Patent No.: US 11,385,255 B2
(45) Date of Patent: Jul. 12, 2022

(54) INERTIAL SENSOR, ELECTRONIC DEVICE, AND VEHICLE

(71) Applicant: Seiko Epson Corporation, Tokyo (JP)

(72) Inventor: Teruo Takizawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/331,210

(22) Filed: May 26, 2021

(65) Prior Publication Data

US 2021/0278434 A1 Sep. 9, 2021

Related U.S. Application Data

(63) Continuation of application No. 16/743,591, filed on Jan. 15, 2020, now Pat. No. 11,047,875.

(30) Foreign Application Priority Data

Jan. 17, 2019 (JP) .............................. JP2019-006416

(51) Int. Cl.
*G01P 15/08* (2006.01)
*G01P 15/125* (2006.01)
(Continued)

(52) U.S. Cl.
CPC .............. *G01P 15/125* (2013.01); *G01P 3/44* (2013.01); *G01P 15/0802* (2013.01); *G01C 21/16* (2013.01)

(58) Field of Classification Search
CPC ...... G01P 15/125; G01P 3/44; G01P 15/0802; G01C 21/16; G01C 19/5747
See application file for complete search history.

(56) References Cited

U.S. PATENT DOCUMENTS 4,342,227 A * 8/1982 Petersen ............. G01P 15/0802
73/514.32
4,472,239 A * 9/1984 Johnson ................ G01F 1/6845
257/E27.008
(Continued)

FOREIGN PATENT DOCUMENTS

JP 2002071354 3/2002
JP 2002540406 11/2002
(Continued)

OTHER PUBLICATIONS

Balachandran et al., "A 3-Axis Gyroscope for Electronic Stability Control with Continuous Self-Test", 2015, Digest of Technical Papers, IEEE International Solid-State Circuits Conference, pp. 474-476.

*Primary Examiner* — David J Bolduc
(74) *Attorney, Agent, or Firm* — Workman Nydegger

(57) ABSTRACT

An inertial sensor includes a substrate and a structure disposed on the substrate. The structure includes a detection movable body which overlaps the substrate in a direction along a Z-axis and includes a movable detection electrode, a detection spring that supports the detection movable body, a drive portion that drives the detection movable body in a direction along an X-axis with respect to the substrate, a fixed detection electrode fixed to the substrate and facing the movable detection electrode, a first compensation electrode for applying an electrostatic attraction force having a first direction component different from the direction along the X-axis to the detection movable body, and a second compensation electrode for applying an electrostatic attraction force having a second direction component opposite to the first direction component to the detection movable body. One of the first compensation electrode and the second (Continued)

compensation electrode includes an adjustment portion that adjusts magnitude of the electrostatic attraction force.

11 Claims, 21 Drawing Sheets

(51) Int. Cl.
*G01P 3/44* (2006.01)
*G01C 21/16* (2006.01)

(56) References Cited

U.S. PATENT DOCUMENTS

| | | | | |
|---|---|---|---|---|
| 4,600,934 A * | 7/1986 | Aine | ................... | H01L 21/3083 |
| | | | | 216/2 |
| 4,999,735 A * | 3/1991 | Wilner | ................ | G01P 15/0802 |
| | | | | 29/25.42 |
| 5,054,320 A * | 10/1991 | Yvon | ..................... | G01P 15/131 |
| | | | | 73/514.21 |
| 5,126,812 A * | 6/1992 | Greiff | ................. | G01P 15/0888 |
| | | | | 257/420 |
| 5,195,371 A * | 3/1993 | Greiff | ................. | G01P 15/0888 |
| | | | | 73/504.18 |
| 5,349,855 A * | 9/1994 | Bernstein | ........... | G01C 19/5719 |
| | | | | 73/504.16 |
| 5,350,189 A * | 9/1994 | Tsuchitani | ............ | G01P 15/125 |
| | | | | 73/514.32 |
| 5,476,007 A * | 12/1995 | Nakamura | ......... | G01C 19/5642 |
| | | | | 73/504.12 |
| 5,635,639 A * | 6/1997 | Greiff | ................... | G01C 19/574 |
| | | | | 73/504.04 |
| 5,962,788 A * | 10/1999 | Fawcett | ............. | G01P 15/0802 |
| | | | | 73/514.32 |
| 6,000,280 A * | 12/1999 | Miller | ...................... | G01B 5/28 |
| | | | | 977/872 |
| 6,571,630 B1 | 6/2003 | Weinberg et al. | | |
| 6,806,797 B2 * | 10/2004 | Kikushima | ............ | H03H 9/215 |
| | | | | 29/25.35 |
| 8,375,786 B2 * | 2/2013 | Neul | .................. | G01C 19/5762 |
| | | | | 73/504.12 |
| 10,302,672 B2 * | 5/2019 | Kanemoto | .............. | G01P 21/02 |
| 10,634,499 B2 * | 4/2020 | Ayazi | .................... | G01P 15/125 |
| 2002/0021059 A1 | 2/2002 | Knowles et al. | | |
| 2005/0150297 A1 * | 7/2005 | Ayazi | ................. | G01C 19/5719 |
| | | | | 73/504.16 |
| 2006/0191340 A1 * | 8/2006 | Geen | .................. | G01C 19/5719 |
| | | | | 73/504.15 |
| 2009/0320591 A1 * | 12/2009 | Johnson | ............. | G01C 19/5719 |
| | | | | 73/504.12 |
| 2011/0296917 A1 * | 12/2011 | Reinmuth | ............. | G01P 15/125 |
| | | | | 29/829 |
| 2014/0311243 A1 * | 10/2014 | Geisberger | ............... | G01B 5/24 |
| | | | | 216/13 |
| 2015/0082885 A1 * | 3/2015 | Rinkio | ...................... | B81B 7/02 |
| | | | | 73/504.12 |
| 2016/0025493 A1 * | 1/2016 | Stewart | ............. | G01C 19/5733 |
| | | | | 73/504.12 |
| 2016/0153781 A1 * | 6/2016 | Blomqvist | ......... | G01C 19/5719 |
| | | | | 73/504.12 |
| 2017/0343351 A1 | 11/2017 | Tormalehto | | |
| 2018/0306581 A1 | 10/2018 | Furuhata et al. | | |

FOREIGN PATENT DOCUMENTS

| | | |
|---|---|---|
| JP | 2017211386 | 11/2017 |
| JP | 2018185188 | 11/2018 |

\* cited by examiner

INERTIAL SENSOR, ELECTRONIC DEVICE, AND VEHICLE

The present application is a continuation of U.S. application Ser. No. 16/743,591, filed Jan. 15, 2020, which is based on, and claims priority from, JP Application No. 2019-006416, filed Jan. 17, 2019, the disclosures of which are hereby incorporated by reference herein in their entirety.

BACKGROUND

1. Technical Field

The present disclosure relates to an inertial sensor, an electronic device, and a vehicle.

2. Related Art

In JP-A-2017-211386, a control circuit for a gyroscope in which two mass elements are driven to be linearly vibrated is described. The control circuit includes a sensor that measures detected vibration of the gyroscope, an A/D converter that amplifies a signal output from the sensor, a demodulator that demodulates the signal amplified by the A/D converter at a drive vibration frequency (OD, a quadrature compensation control unit that sends the signal demodulated by the demodulator to a compensation electrode and performs quadrature compensation of the gyroscope.

However, in the control circuit described in JP-A-2017-211386, since the signal sent to the compensation electrode maximizes a power supply voltage of the control circuit, sufficient orthogonal compensation cannot be performed depending on a vibration state of the two mass elements, that is, magnitude of the quadrature. That is, if the quadrature is small, the quadrature can be sufficiently reduced even with a signal that maximizes the power supply voltage, but, if the quadrature is large, the quadrature cannot be sufficiently reduced depending on the signal that maximizes the power supply voltage.

SUMMARY

An inertial sensor according to an aspect of the present disclosure includes a substrate and a structure disposed on the substrate, in which the structure includes a detection movable body which overlaps the substrate in a direction along a Z-axis and includes a movable detection electrode, a detection spring that supports the detection movable body, a drive portion that drives the detection movable body in a direction along an X-axis with respect to the substrate, a fixed detection electrode fixed to the substrate and facing the movable detection electrode, a first compensation electrode for applying an electrostatic attraction force having a first direction component different from the direction along the X-axis to the detection movable body, and a second compensation electrode for applying an electrostatic attraction force having a second direction component opposite to the first direction component to the detection movable body, and one of the first compensation electrode and the second compensation electrode includes an adjustment portion that adjusts magnitude of the electrostatic attraction force, in which the X-axis, a Y-axis, and the Z-axis are three axes orthogonal to each other.

DESCRIPTION OF EXEMPLARY EMBODIMENTS

Hereinafter, an inertial sensor, an electronic device, and a vehicle according to the present disclosure will be described in detail based on embodiments illustrated in the accompanying drawings.

First Embodiment

Figure 1:
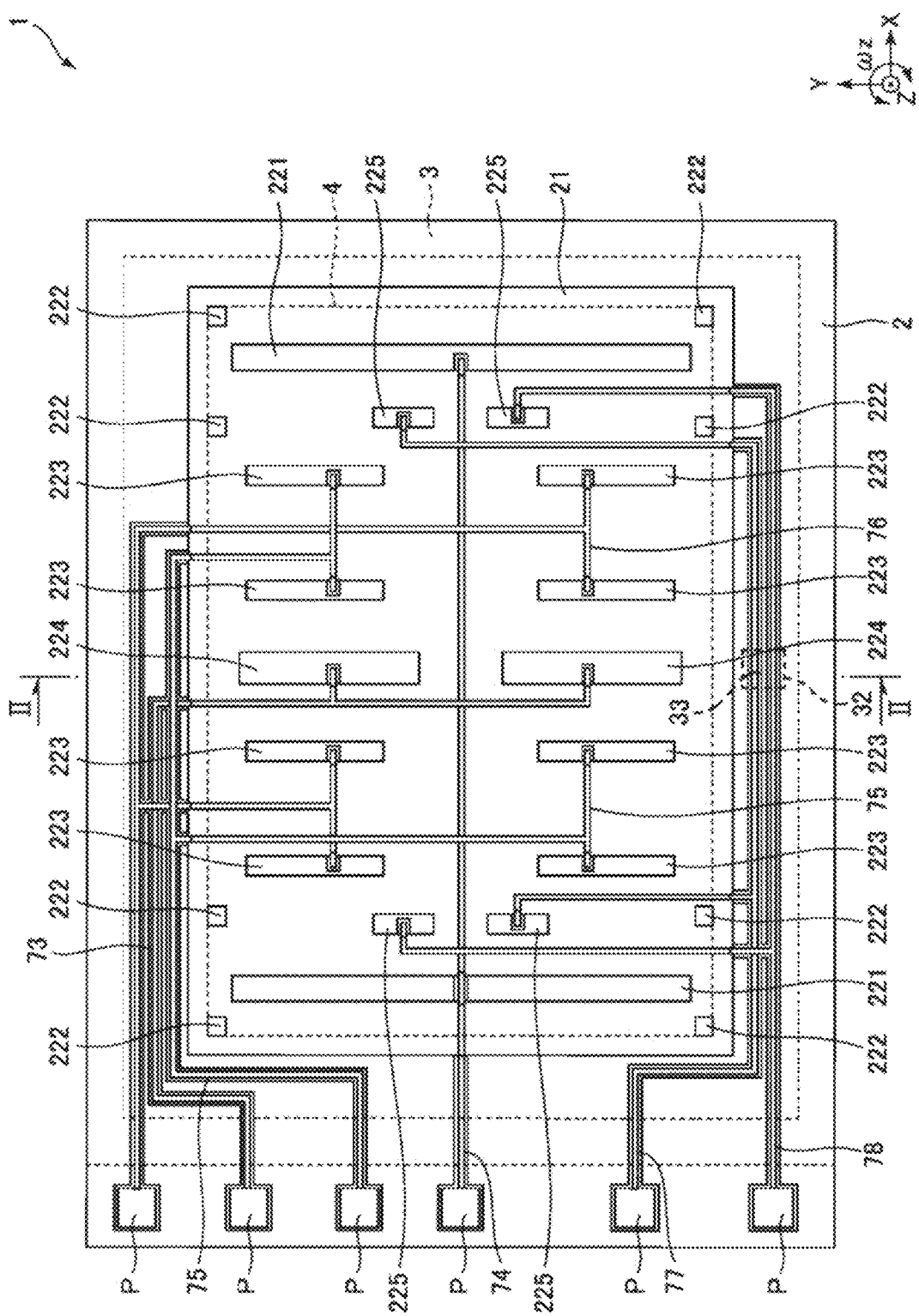
FIG. 1 is a plan view illustrating an inertial sensor according to a first embodiment.
Figure 2:
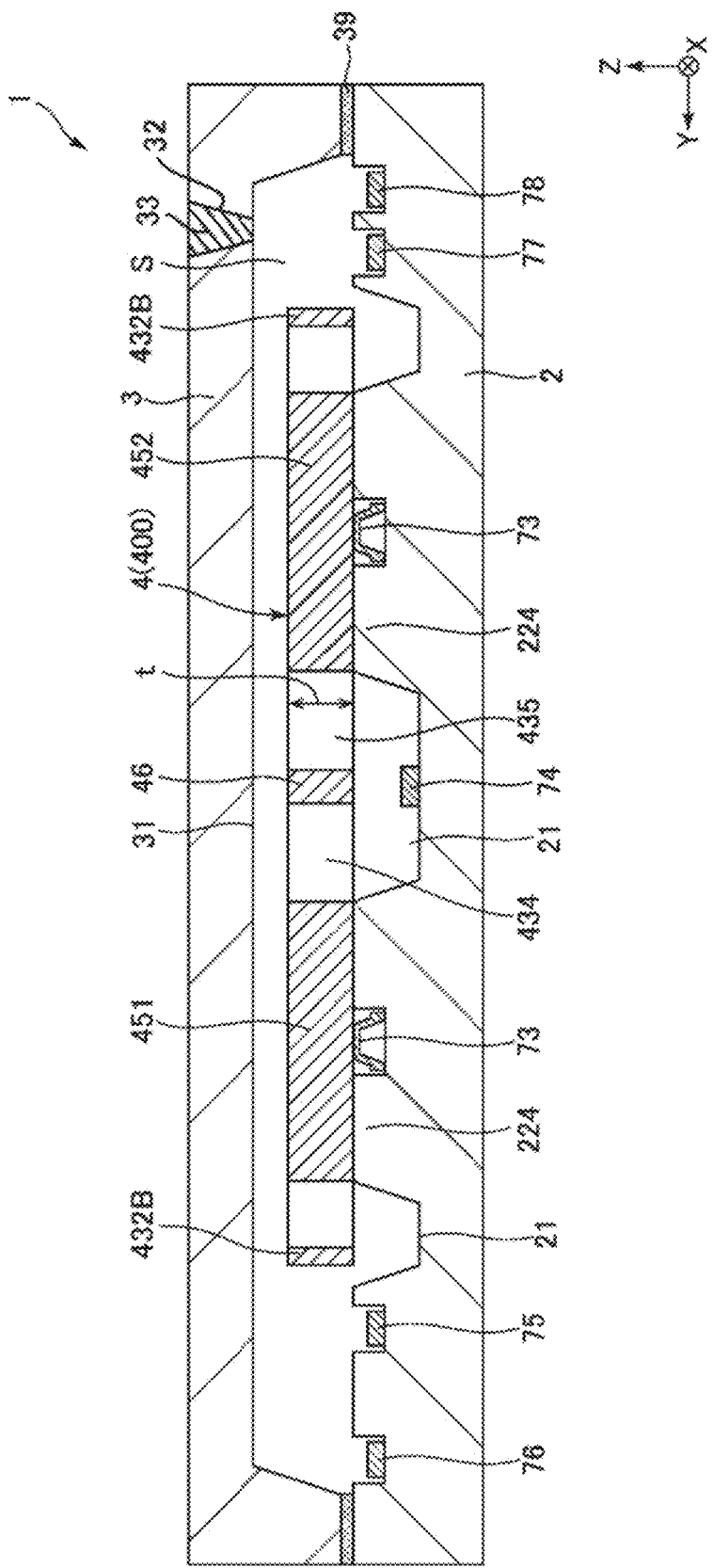
FIG. 2 is a cross-sectional view taken along line II-II in FIG. 1.
Figure 3:
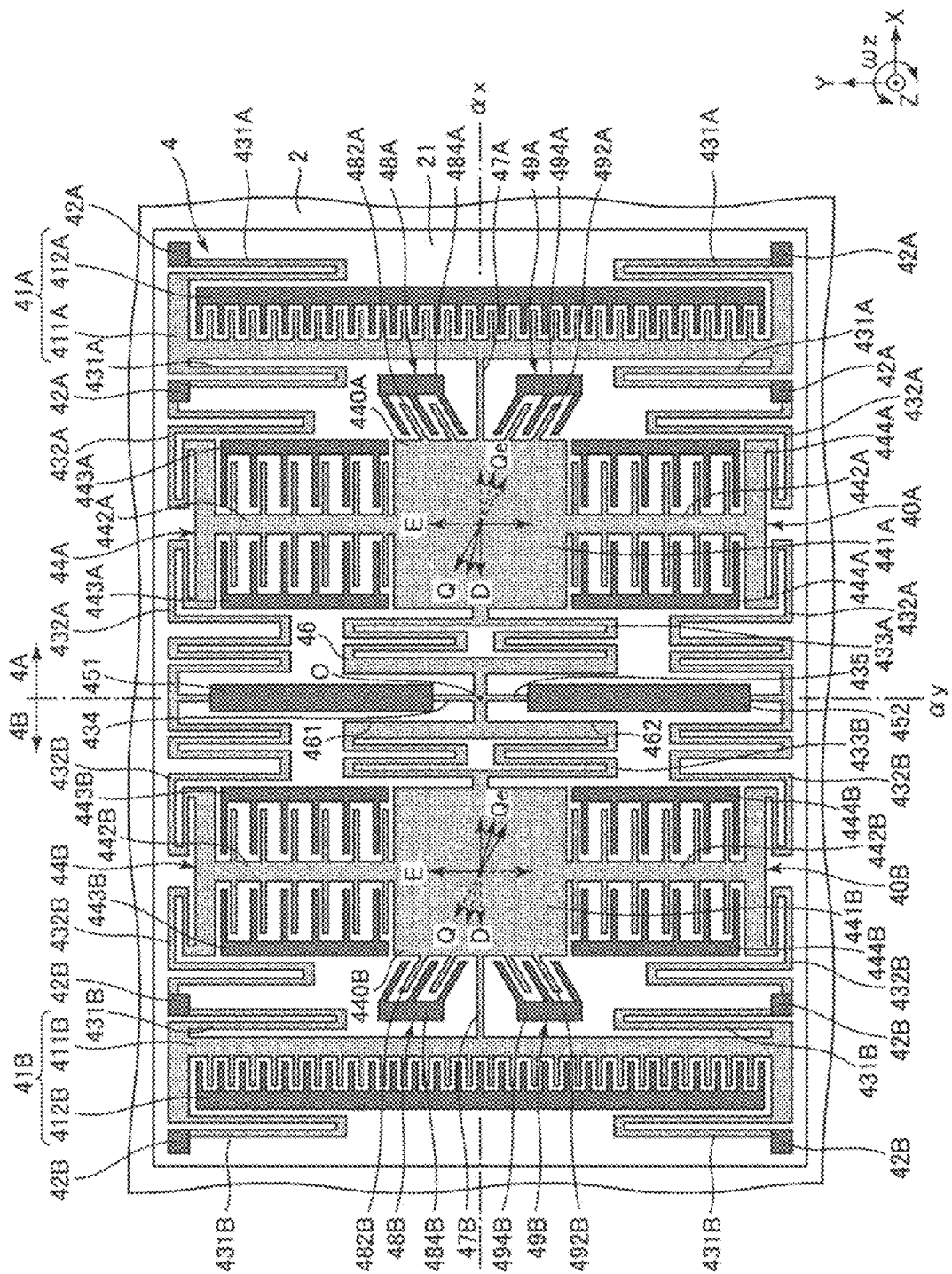
FIG. 3 is a plan view illustrating a sensor element included in the inertial sensor of FIG. 1.
Figure 4:
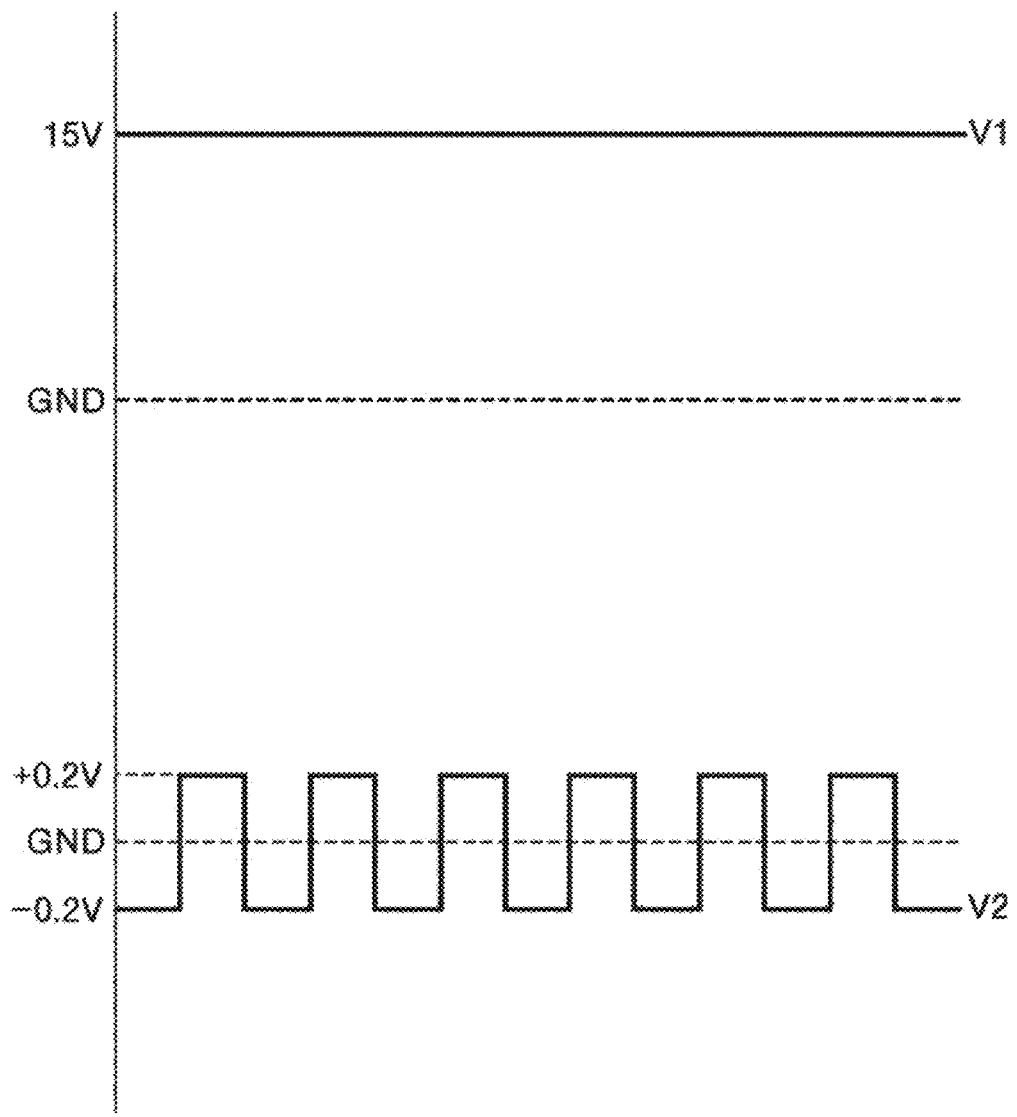
FIG. 4 is a diagram illustrating a drive voltage to be applied to the inertial sensor of FIG. 1.
Figure 5:
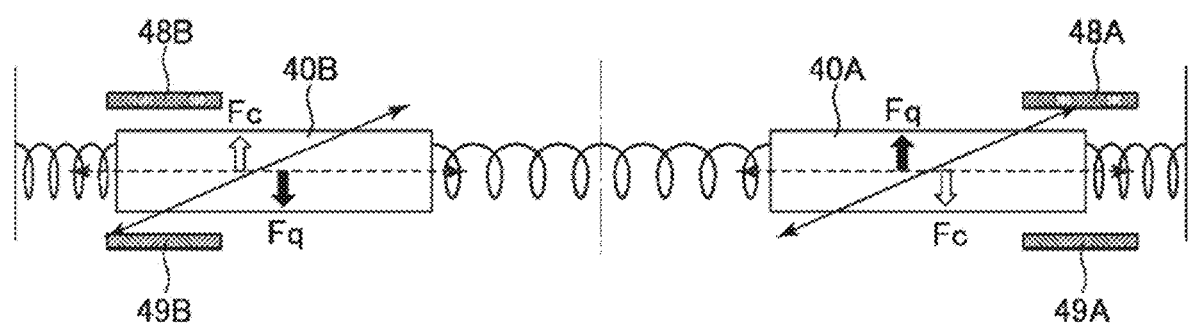
FIG. 5 is a conceptual diagram illustrating a mechanism for suppressing quadrature.
Figure 6:
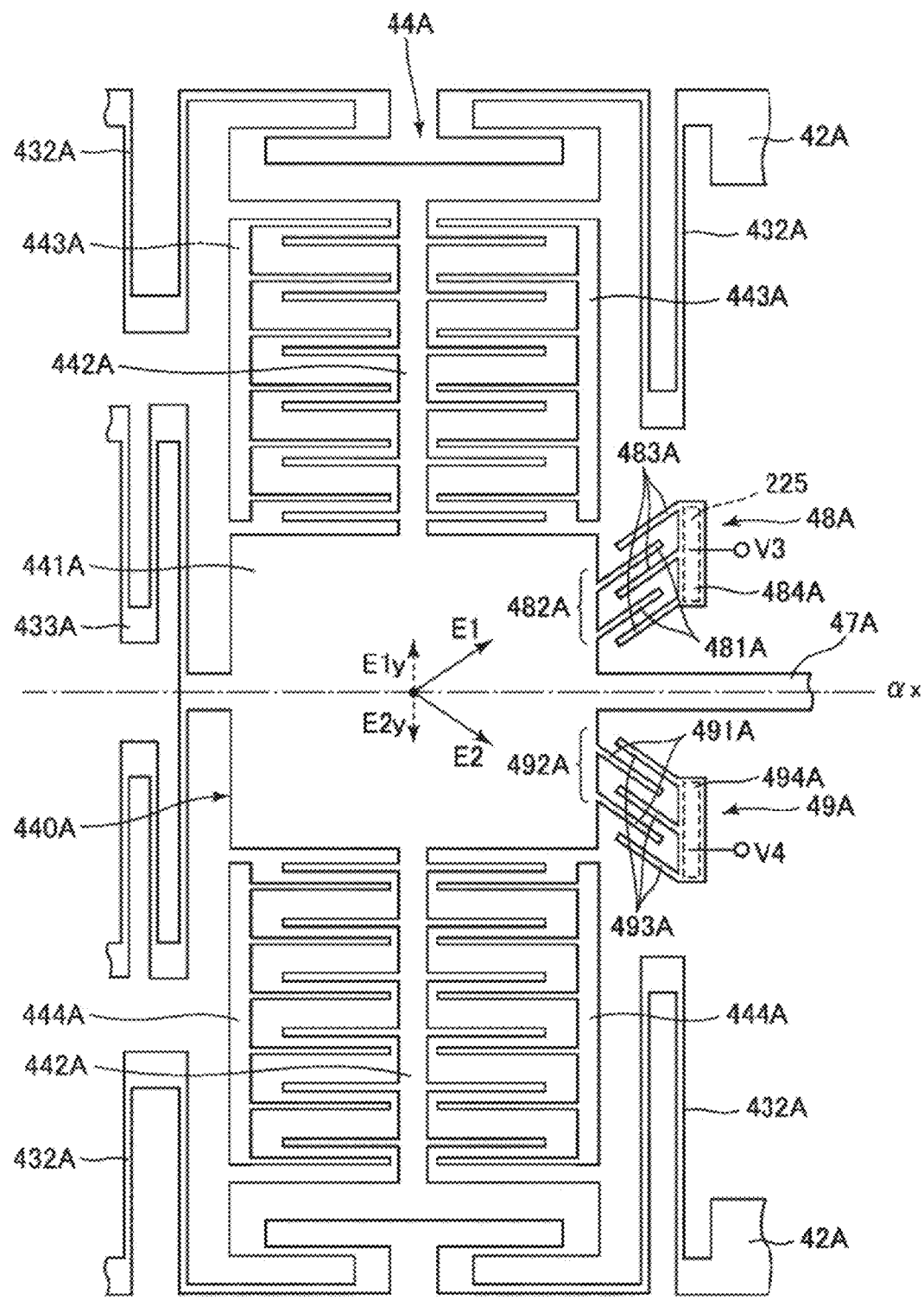
FIG. 6 is a plan view illustrating one movable body.
Figure 7:
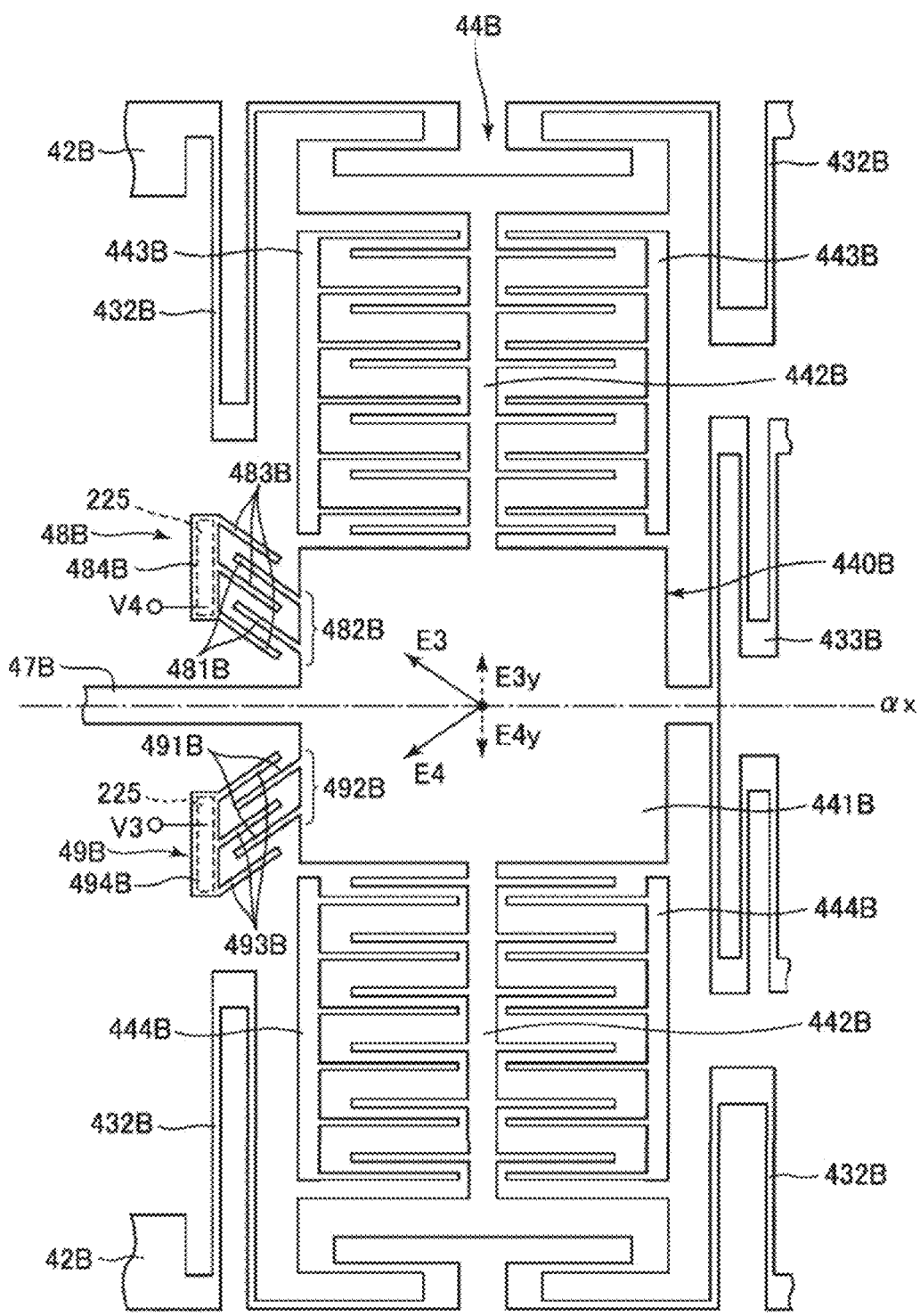
FIG. 7 is a plan view illustrating the other movable body.
Figure 8:
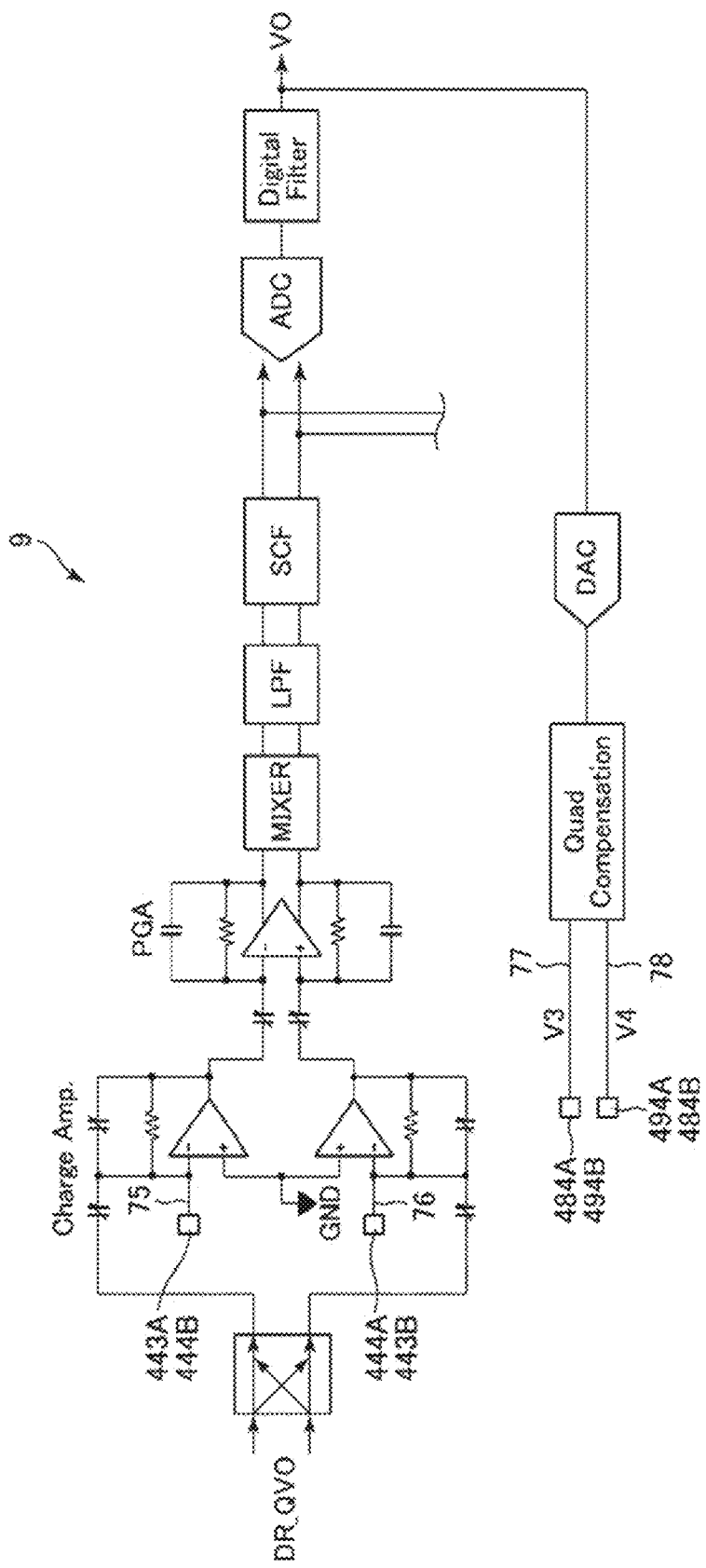
FIG. 8 is a circuit diagram illustrating a control circuit.
Figure 9:
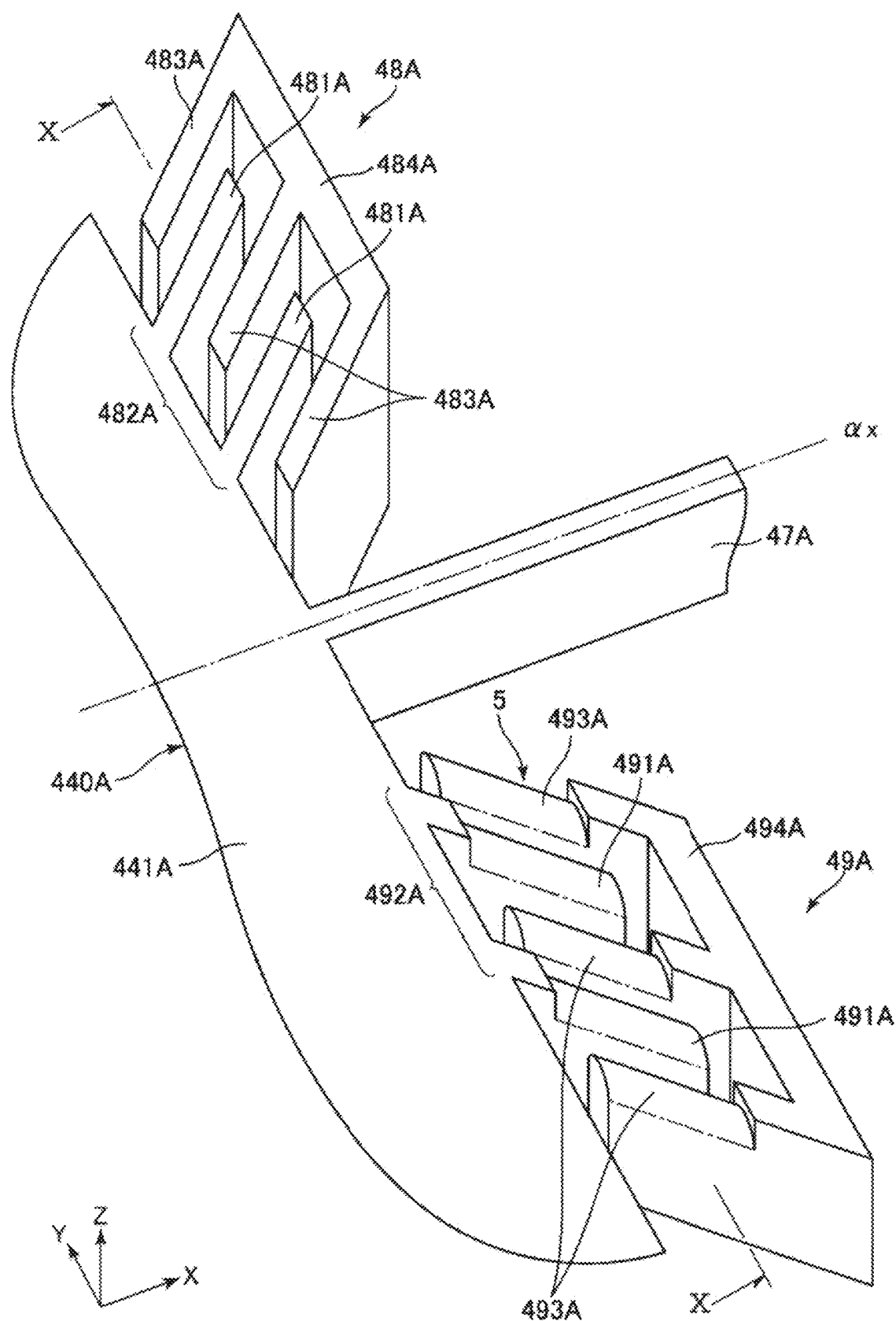
FIG. 9 is a perspective view illustrating an adjustment portion.
Figure 10:
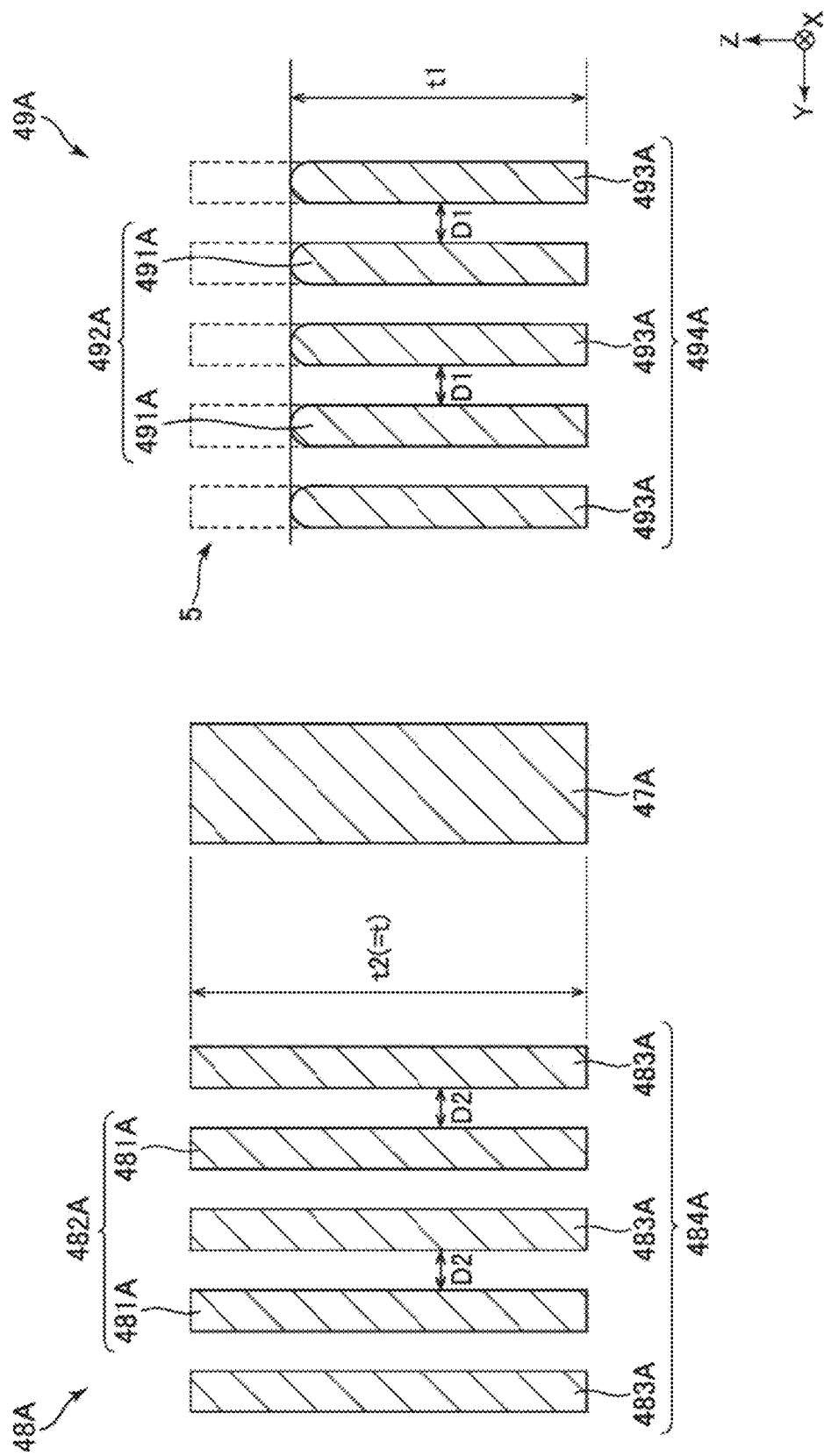
FIG. 10 is a cross-sectional view taken along line X-X in FIG. 9.
Figure 11:
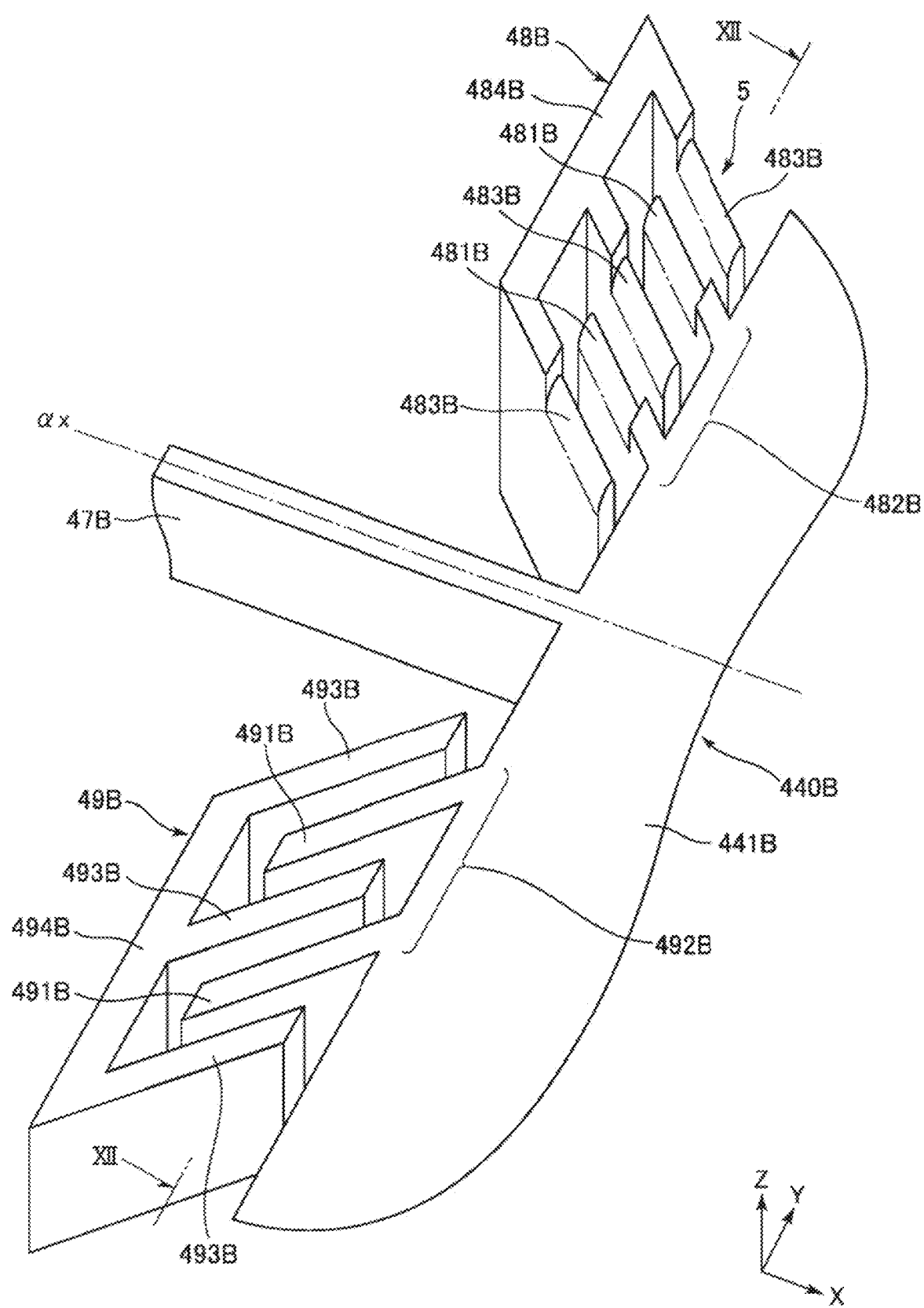
FIG. 11 is a perspective view illustrating an adjustment portion.
Figure 12:
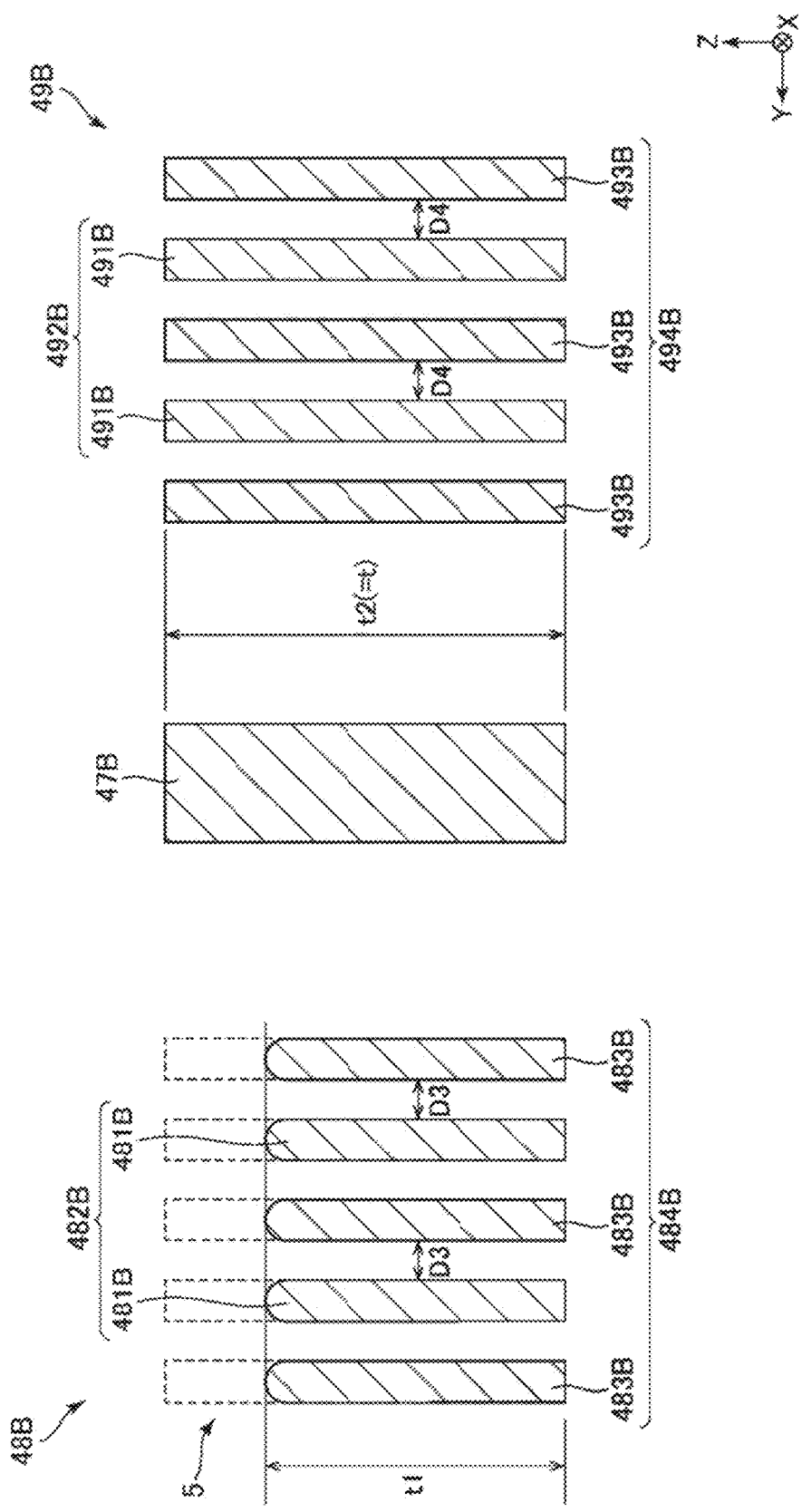
FIG. 12 is a cross-sectional view taken along line XII-XII in FIG. 11.

FIG. 1 is a plan view illustrating an inertial sensor according to a first embodiment. FIG. 2 is a cross-sectional view taken along line II-II in FIG. 1. FIG. 3 is a plan view illustrating a sensor element included in the inertial sensor of FIG. 1. FIG. 4 is a diagram illustrating a drive voltage to be applied to the inertial sensor of FIG. 1. FIG. 5 is a conceptual diagram illustrating a mechanism for suppressing quadrature. FIG. 6 is a plan view illustrating one movable body. FIG. 7 is a plan view illustrating the other movable body. FIG. 8 is a circuit diagram illustrating a control circuit. FIG. 9 is a perspective view illustrating an adjustment portion. FIG. 10 is a cross-sectional view taken along line X-X in FIG. 9. FIG. 11 is a perspective view illustrating an adjustment portion. FIG. 12 is a cross-sectional view taken along line XII-XII in FIG. 11. FIGS. 13 to 16 are cross-sectional views illustrating modification examples of the adjustment portion.

In each drawing, the X-axis, Y-axis, and Z-axis are illustrated as three axes orthogonal to each other. A direction along the X-axis, that is, a direction parallel to the X-axis is referred to as an "X-axis direction", a direction along the Y-axis is referred as a "Y-axis direction", and a direction along the Z-axis is referred as a "Z-axis direction". A tip end side of the arrow of each axis is also referred to as a "plus side", and the opposite side is also referred to a "minus side". In addition, the plus side in the Z-axis direction is also referred to as "upper", and the minus side in the Z-axis direction is also referred to as "lower". In the specification of the present application, the term "orthogonal to" includes not only a case where constituent elements intersect at 90 but also a case where the constituent elements intersect at an angle slightly inclined from 90°, for example, within a range of 90°±5°.

The inertial sensor 1 illustrated in FIG. 1 is an angular velocity sensor capable of measuring the angular velocity ωz around the Z-axis. The inertial sensor 1 includes a substrate 2, a lid 3, and a sensor element 4.

The substrate 2 includes a concave portion 21 which is open to the upper surface. The concave portion 21 functions as a relief portion for preventing contact between the sensor element 4 and the substrate 2. The substrate 2 includes a plurality of mounts 221, 222, 223, 224, and 225 protruding from the bottom surface of the concave portion 21. The sensor element 4 is bonded to the upper surfaces of the mounts 221 to 225. Furthermore, the substrate 2 includes a groove which is open to the upper surface thereof, and wirings 73, 74, 75, 76, 77, and 78 are disposed thereon. One end portions of the wirings 73 to 78 are exposed to the outside of the lid 3, respectively, and function as electrode pads P that makes electrical connection with an external apparatus. The electrode pad P is disposed on the short side of the substrate 2. With this configuration, the electrode pad P can be disposed in the substrate 2 without waste and the die size can be reduced, and thus miniaturization of the inertial sensor 1 can be achieved.

As such a substrate 2, for example, a glass substrate made of a glass material containing alkali metal ions such as sodium ions, specifically, borosilicate glass such as Tempax glass (registered trademark) and Pyrex glass (registered trademark) can be used. However, a constituent material of the substrate 2 is not particularly limited, and a silicon substrate, a ceramic substrate, and the like may be used.

As illustrated in FIG. 2, the lid 3 has a concave portion 31 which opens to the lower surface. The lid 3 is bonded to the upper surface of the substrate 2 so as to accommodate the sensor element 4 in the concave portion 31. An accommodation space S in which the sensor element 4 is accommodated is formed by the lid 3 and the substrate 2. The accommodation space S may be in a reduced pressure state, particularly in a vacuum state. As a result, the viscous resistance decreases, and the sensor element 4 can efficiently vibrate.

The lid 3 is provided with a through-hole 32 that communicates the inside and outside of the accommodation space S and the through-hole 32 is sealed with a sealing material 33. In other words, the accommodation space S is blocked from the atmosphere outside the inertial sensor 1 by the through-hole 32 and a bonding material 39. In this case, a part or whole of the through-hole 32 is filled with the sealing material 33.

As such a lid 3, for example, a silicon substrate can be used. However, the lid 3 is not particularly limited, and for example, a glass substrate or a ceramic substrate may be used as the lid 3. A bonding method between the substrate 2 and the lid 3 is not particularly limited, and may be appropriately selected depending on the materials of the substrate 2 and the lid 3. However, in the first embodiment, the substrate 2 and the lid 3 are bonded through a glass frit material which is low melting point glass as the bonding material 39.

The sensor element 4 is disposed in the accommodation space S and is bonded to the upper surfaces of the mounts 221 to 225. The sensor element 4 can be formed by patterning a conductive silicon substrate 400 doped with, for example, impurities such as phosphorus (P), boron (B), arsenic (As) or the like by the Bosch process which is a deep groove etching technique. However, the method of forming the sensor element 4 is not limited to the Bosch process. The silicon substrate 400 has substantially the same thickness t throughout the entire area except for an adjustment portion 5 described later.

Hereinafter, a configuration of the sensor element 4 will be described with reference to FIG. 3. In the following description, a straight line intersecting with the center O of the sensor element 4 and extending in the Y-axis direction is also referred to as an "imaginary straight line αy" and a straight line intersecting with the center O of the sensor element 4 and extending in the X-axis direction is also referred to as an "imaginary straight line αx", in plan view in the Z-axis direction.

As illustrated in FIG. 3, the sensor element 4 has two structures 4A and 4B disposed in the X-axis direction and positioned on both sides of the imaginary straight line αy across the imaginary straight line αy. The structures 4A and 4B have a line-symmetric shape with respect to the imaginary straight line αy. In the following, it is meant that a constituent element whose reference numeral ends with "A" is included in a structure 4A and whose reference numeral ends with "B" is included in the structure 4B.

Such a sensor element 4 includes two drive portions 41A and 41B disposed on both sides of the imaginary straight line αy. The drive portion 41A includes a comb teeth-shaped movable drive electrode 411A and a fixed drive electrode 412A which is engaged with the movable drive electrode 411A. In other words, the movable drive electrode 411A and the fixed drive electrode 412A constitute a pair of comb-teeth electrodes facing each other. Similarly, the drive portion 41B includes a comb teeth-shaped movable drive electrode 411B and a comb teeth-shaped fixed drive electrode 412B which is engaged with the movable drive electrode 411B. In other words, the movable drive electrode 411B and the fixed drive electrode 412B constitute a pair of comb-teeth electrodes facing each other. The fixed drive electrodes 412A and 412B are bonded to the upper surface of the mount 221, respectively. The movable drive electrodes 411A and 411B are electrically connected to the wiring 73, and the fixed drive electrodes 412A and 412B are electrically connected to the wiring 74.

The sensor element 4 includes four fixed portions 42A disposed around the drive portion 41A and four fixed portions 42B disposed around the drive portion 41B. Each of the fixed portions 42A and 42B is bonded to the upper surface of the mount 222.

The sensor element 4 includes four drive springs 431A that couples the fixed portions 42A and the movable drive electrode 411A and four drive springs 431B that couples the fixed portions 42B and the movable drive electrode 411B.

Each drive spring 431A is elastically deformed in the X-axis direction to allow displacement of the movable drive electrode 411A in the X-axis direction and each drive spring 431B is elastically deformed in the X-axis direction to allow displacement of the movable drive electrode 411B in the X-axis direction.

The sensor element 4 includes a detection portion 44A disposed between the imaginary straight line αy and the drive portion 41A, and a detection portion 44B disposed between the imaginary straight line αy and the drive portion 41B.

The detection portion 44A includes a detection movable body 440A including a base 441A and comb-teeth shaped movable detection electrodes 442A positioned on both sides of the base 441A in the Y-axis direction, comb-teeth shaped fixed detection electrodes 443A engaged with the movable detection electrodes 442A on the plus side in the Y-axis direction, and comb-teeth shaped fixed detection electrodes 444A engaged with the movable detection electrodes 442A on the minus side in the Y-axis direction. Each of pairs of fixed detection electrodes 443A and 444A is disposed so as to sandwich each movable detection electrode 442A from both sides in the X-axis direction.

Similarly, the detection portion 44B includes a detection movable body 440B including a base 441B and comb-teeth shaped movable detection electrodes 442B positioned on both sides of the base in the Y-axis direction, comb-teeth shaped fixed detection electrodes 443B engaged with the movable detection electrodes 442B on the positive side in the Y-axis direction, and comb-teeth shaped fixed detection electrodes 444B engaged with the movable detection electrodes 442B on the negative side in the Y-axis direction. Each of pairs of fixed detection electrodes 443B and 444B is disposed so as to sandwich each movable detection electrode 442B from both sides in the X-axis direction.

The fixed detection electrodes 443A, 444A, 443B, and 444B are bonded to the upper surface of the mount 223, respectively. The detection movable bodies 440A and 440B are electrically connected to the wiring 73, the fixed detection electrodes 443A and 443B are electrically connected to the wiring 75, and the fixed detection electrodes 444A and 443B are electrically connected to the wiring 76. The wirings 75 and 76 are connected to a charge amplifier through electrode pads P, respectively. When the inertial sensor 1 is driven, a capacitance Ca is formed between the movable detection electrode 442A and the fixed detection electrode 443A and between the movable detection electrode 442B and the fixed detection electrode 444B, and a capacitance Cb is formed between the movable detection electrode 442A and the fixed detection electrode 444A and between the movable detection electrode 442B and the fixed detection electrode 444B.

The sensor element 4 includes two fixed portions 451 and 452 that are positioned between the detection portions 44A and 44B and disposed along the imaginary straight line αy. The fixed portions 451 and 452 are respectively bonded to the upper surface of the mount 224 and fixed to the substrate 2. The fixed portions 451 and 452 are disposed side by side in the Y-axis direction and disposed with a space therebetween. In the first embodiment, the movable drive electrodes 411A and 411B and the movable detection electrodes 442A and 442B are electrically connected to the wiring 73 through the fixed portions 451 and 452.

The sensor element 4 includes four detection springs 432A that couple the detection movable body 440A and the fixed portions 42A, 451, and 452, and four detection springs 432B that couple the detection movable body 440B and the fixed portions 42B, 451, and 452. Each detection spring 432A is elastically deformed in the X-axis direction to allow displacement of the detection movable body 440A in the X-axis direction and elastically deformed in the Y-axis direction to allow displacement of the detection movable body 440A in the Y-axis direction. Similarly, each detection spring 432B is elastically deformed in the X-axis direction to allow displacement of the detection movable body 440B in the X-axis direction and elastically deformed in the Y-axis direction to allow displacement of the detection movable body 440B in the Y-axis direction.

The sensor element 4 includes a coupling beam 47A positioned between the movable drive electrode 411A and the movable detection body 440A and connecting the movable drive electrode 411A and the detection movable body 440A and a coupling beam 47B positioned between the movable drive electrode 411B and the detection movable body 440B and connecting the movable drive electrode 411B and the detection movable body 440B. In the following description, an aggregate of the movable drive electrode 411A, the movable detection body 440A, and the coupling beam 47A is also referred to as a "movable body 40A", and an aggregate of the movable drive electrode 411B, the movable detection body 440B, and the coupling beam 47B is also referred to as a "movable body 40B".

The sensor element 4 includes a frame 46 that is positioned between the detection movable bodies 440A and 440B at the center thereof. The frame 46 has an "H" shape and includes a concave defective portion 461 positioned on the plus side in the Y-axis direction and a concave defective portion 462 positioned on the minus side in the Y-axis direction. A fixed portion 451 is disposed inside and outside of the defective portion 461 and a fixed portion 452 is disposed inside and outside the defective portion 462.

The sensor element 4 includes a frame spring 434 positioned between the fixed portion 451 and the frame 46 and connecting the fixed portion 451 and the frame 46 and a frame spring 435 positioned between the fixed portion 452 and the frame 46 and connecting the fixed portion 452 and the frame 46. Each of the frame springs 434 and 435 extends in the Y-axis direction and can be elastically deformed in the X-axis direction.

The sensor element 4 includes a connection spring 433A positioned between the frame 46 and the detection movable body 440A and connecting the frame 46 and the detection movable body 440A and a connection spring 433B positioned between the frame 46 and the detection movable body 440B and connecting the frame 46 and the detection movable body 440B. The connection spring 433A supports the detection movable body 440A together with the detection spring 432A, and the connection spring 433B supports the detection movable body 440B together with the detection spring 432B.

In the sensor element 4 having such a configuration, for example, when a DC voltage V1 illustrated in FIG. 4 is applied to the movable bodies 40A and 40B through the wiring 73 and an AC voltage V2 illustrated in FIG. 4 is applied to the fixed drive electrodes 412A and 412B through the wiring 74, due to electrostatic attraction force acting between the movable bodies 40A and 40B, the movable bodies 40A and 40B vibrate in opposite phases in such a way that the movable bodies 40A and 40B repeat approaching and separating from each other in the X-axis direction as indicated by an arrow D in FIG. 3. This is because the electrostatic attraction force that causes the movable body to alternately approach and separate is generated in a form proportional to a product of the DC voltage and the AC voltage. Thus, when the movable bodies 40A and 40B vibrate in opposite phases, these vibrations are canceled and the inertial sensor 1 with less vibration leakage is obtained. Hereinafter, this vibration mode is also referred to as "drive vibration mode".

When an angular velocity ωz around the Z-axis is applied to the sensor element 4 in a state where the movable body 40A and the movable body 40B are driven in the drive vibration mode, the movable bodies 40A and 40B vibrate in opposite phases in the Y-axis direction, as indicated by an arrow E in FIG. 3, due to the Coriolis force, and the capacitances Ca and Cb change according to this vibration. Accordingly, the angular velocity ωz received by the sensor element 4 can be obtained based on the changes in the capacitances Ca and Cb. Hereinafter, this vibration mode is also referred to as "detection vibration mode".

The voltages V1 and V2 are not particularly limited as long as the drive vibration mode can be excited. In the inertial sensor 1 of the first embodiment, although an electrostatic drive method is used in which the drive vibration mode is excited by electrostatic attraction force, a method of exciting the drive vibration mode is not particularly limited, and for example, a piezoelectric drive method, an electromagnetic drive method using a Lorentz force of a magnetic field, or the like can also be applied.

Here, ideally, in the drive vibration mode described above, the movable bodies 40A and 40B vibrate in the X-axis direction, respectively. In other words, in the drive vibration mode, the movable bodies may not vibrate in directions other than the X-axis direction, particularly in the Y-axis direction. However, for example, a shape shift occurs due to etching accuracy of the silicon substrate 400, and the shape shift may cause the movable bodies 40A and 40B to vibrate in an oblique direction including the Y-axis direction component, as indicated by an arrow Q in FIG. 3. As such, when the movable bodies 40A and 40B obliquely vibrate, the capacitances Ca and Cb change even though the angular velocity ωz is not applied. For that reason, noise consisting of quadrature signals is generated due to this, and detection accuracy of the angular velocity ωz is deteriorated. In the following, vibrations other than the X-axis direction of the movable bodies 40A and 40B in the drive vibration mode, particularly vibrations in the Y-axis direction are also referred to as the quadrature.

As illustrated in the conceptual diagram of FIG. 5, in the inertial sensor 1, the quadrature is canceled by applying a force Fc that balances a force Fq causing the quadrature to the movable bodies 40A and 40B. In order to generate such a force Fc, the inertial sensor 1 includes first compensation electrodes 48A and 48B and second compensation electrodes 49A and 49B.

As illustrated in FIG. 3, the first and second compensation electrodes 48A and 49A are positioned between the detection movable body 440A and the drive portion 41A. For that reason, the space between the detection movable body 440A and the drive portion 41A can be effectively used, and miniaturization of the sensor element 4 can be achieved. As illustrated in FIG. 6, the first compensation electrode 48A is positioned on the plus side in the Y-axis direction with respect to the coupling beam 47A, and the second compensation electrode 49A is positioned on the minus side in the Y-axis direction with respect to the coupling beam 47A. These first and second compensation electrodes 48A and 49A are line symmetric with respect to the imaginary straight line αx.

The first compensation electrode 48A includes a comb-teeth shaped movable compensation electrode 482A having a plurality of movable electrode fingers 481A and a comb-teeth shaped fixed compensation electrode 484A including a plurality of fixed electrode fingers 483A and disposed to be engaged with the movable compensation electrode 482A. The movable compensation electrode 482A is provided so as to extend from the base 441A, and the fixed compensation electrode 484A is bonded to the upper surface of the mount 225. The movable electrode finger 481A and the fixed electrode finger 483A extend along oblique directions inclined with respect to the X-axis and the Y-axis, respectively.

The movable compensation electrode 482A is electrically connected to the wiring 73 and the fixed compensation electrode 484A is electrically connected to the wiring 77. When a compensation voltage V3 is applied to the fixed compensation electrode 484A through the wiring 77, electrostatic attraction force is generated between the movable compensation electrode 482A and the fixed compensation electrode 484A and electrostatic attraction force E1 acts on the detection movable body 440A. In the electrostatic attraction force E1, a component E1y toward the plus side in the Y-axis direction is included.

Similarly, the second compensation electrode 49A includes a comb-teeth shaped movable compensation electrode 492A having a plurality of movable electrode fingers 491A and a comb-teeth shaped fixed compensation electrode 494A including a plurality of fixed electrode fingers 493A and disposed to be engaged with the movable compensation electrode 492A. The movable compensation electrode 492A is provided so as to extend from the base 441A, and the fixed compensation electrode 494A is bonded to the upper surface of the mount 225. The movable electrode finger 491A and the fixed electrode finger 493A extend along oblique directions inclined with respect to the X-axis and the Y-axis, respectively.

The movable compensation electrode 492A is electrically connected to the wiring 73 and the fixed compensation electrode 494A is electrically connected to the wiring 78. When a compensation voltage V4 is applied to the fixed compensation electrode 494A through the wiring 78, electrostatic attraction force is generated between the movable compensation electrode 492A and the fixed compensation electrode 494A and electrostatic attraction force E2 acts on the detection movable body 440A. In the electrostatic attraction force E2, a component E2y toward the minus side in the Y-axis direction opposite to the electrostatic attraction force E1 is included.

As illustrated in FIG. 3, the first and second compensation electrodes 48B and 49B are positioned between the detection movable body 440B and the drive portion 41B. For that reason, the space between the detection movable body 440B and the drive portion 41B can be effectively used, and miniaturization of the sensor element 4 can be achieved. As illustrated in FIG. 7, the first compensation electrode 48B is positioned on the plus side in the Y-axis direction with respect to the coupling beam 47B, and the second compensation electrode 49B is positioned on the minus side in the Y-axis direction with respect to the coupling beam 47B. These first and second compensation electrodes 48B and 49B are line symmetric with respect to the imaginary straight line αx. The first and second compensation electrodes 48B and 49B are line symmetric with the first and second compensation electrodes 48A and 49A with respect to the imaginary straight line αy.

The first compensation electrode 48B includes a comb-teeth shaped movable compensation electrode 482B including a plurality of movable electrode fingers 481B and a comb-teeth shaped fixed compensation electrode 484B including a plurality of fixed electrode fingers 483B and disposed to be engaged with the movable compensation electrode 482B. The movable compensation electrode 482B is provided on the base 441B, and the fixed compensation electrode 484B is bonded to the upper surface of the mount 225. The movable electrode finger 481B and the fixed electrode finger 483B extend along oblique directions inclined with respect to the X-axis and the Y-axis, respectively.

The movable compensation electrode 482B is electrically connected to the wiring 73 and the fixed compensation electrode 484B is electrically connected to the wiring 78 together with the fixed compensation electrode 494A described above. When a compensation voltage V4 is applied to the fixed compensation electrode 484B through the wiring 78, an electrostatic attraction force is generated between the movable compensation electrode 482B and the fixed compensation electrode 484B and an electrostatic attraction force E3 acts on the detection movable body 440B. In the electrostatic attraction force E3, a component E3y toward the plus side in the Y-axis direction is included.

The second compensation electrode 49B includes a comb-teeth shaped movable compensation electrode 492B including a plurality of movable electrode fingers 491B and a comb-teeth shaped fixed compensation electrode 494B including a plurality of fixed electrode fingers 493B and disposed to be engaged with the movable compensation electrode 492B. The movable compensation electrode 492B is provided on the base 441B, and the fixed compensation electrode 494B is bonded to the upper surface of the mount 225. The movable electrode fingers 491B and the fixed electrode fingers 493B extend along oblique directions inclined with respect to the X-axis and the Y-axis, respectively.

The movable compensation electrode 492B is electrically connected to the wiring 73 and the fixed compensation electrode 494B is electrically connected to the wiring 77 together with the fixed compensation electrode 484A described above. When the compensation voltage V3 is applied to the fixed compensation electrode 494B through the wiring 77, an electrostatic attraction force is generated between the movable compensation electrode 492B and the fixed compensation electrode 494B and electrostatic attraction force E4 acts on the detection movable body 440B. In the electrostatic attraction force E4, a component E4y toward the minus side in the Y-axis direction is included.

According to such first and second compensation electrodes 48A, 48B, 49A, and 49B, by controlling magnitudes of the compensation voltages V3 and V4 and adjusting magnitudes of the electrostatic attraction forces E1 to E4, the force Fc that balances the force Fq causing quadrature can be applied to the movable bodies 40A and 40B. For example, as illustrated in FIG. 3, when the movable bodies 40A and 40B vibrate in the direction indicated by an arrow Q in the drive vibration mode, the compensation voltage V3 (electrostatic attraction forces E1 and E4) may be made larger than the compensation voltage V4 (electrostatic attraction forces E2 and E3) so that the force Fc is balanced with the force Fq.

The control circuit of the inertial sensor 1 is not particularly limited, but for example, a control circuit 9 illustrated in FIG. 8 can be used. In the control circuit 9, feedback control (closed loop control) is performed to feed back a detection signal VO and control the magnitudes of the compensation voltages V3 and V4 so that the quadrature signal becomes zero. By using such a control circuit 9, the quadrature can be more reliably and easily suppressed.

Here, in the control circuit 9, a voltage that can be applied to the compensation voltages V3 and V4 is an AC voltage that maximizes the power supply voltage of the control circuit 9. For that reason, when large quadrature is generated, the quadrature may not be completely canceled only by controlling the compensation voltages V3 and V4. For example, the compensation voltages V3 and V4 larger than the power supply voltage can also be used by incorporating a boosting circuit in the control circuit 9 and boosting the power supply voltage (for example, 40 V to 50 V), but in this case, when the electrode is short-circuited due to impact, contamination by foreign substance, or the like, an excessive current flows into the sensor element 4, which may cause malfunction or damage of the sensor element 4. Therefore, the inertial sensor 1 is provided with an adjustment portion 5 that can increase the force Fc without using excessive compensation voltages V3 and V4. The compensation voltages V3 and V4 are not particularly limited, but, for example, the maximum value thereof can be about 12 V to 18 V.

Hereinafter, as illustrated in FIG. 3, the case where the quadrature indicated by the arrow Q is generated in the drive vibration mode and reduced to the quadrature indicated by an arrow Qe by controlling the compensation voltages V3 and V4 will be described as a representative.

In this case, the adjustment portion 5 is formed on the second compensation electrode 49A and the first compensation electrode 48B. In the second compensation electrode 49A, the electrostatic attraction force E2 is reduced by forming the adjustment portion 5, and similarly, in the first compensation electrode 48B, the electrostatic attraction force E3 is reduced by forming the adjustment portion 5. For that reason, if the compensation voltages V3 and V4 are the same, a difference ΔE between the electrostatic attraction forces E1 and E4 and the electrostatic attraction forces E2 and E3 is greater in a configuration in which the adjustment portion 5 is formed than in a configuration in which the adjustment portion 5 is not formed, and the force Fc can be correspondingly increased. For that reason, even a large quadrature that cannot be canceled by the existing technique as indicated by the arrow Q can be canceled more reliably.

Next, a specific configuration of the adjustment portion 5 will be described. In FIG. 9, the second compensation electrode 49A in which the adjustment portion 5 is formed and the first compensation electrode 48A in which the adjustment portion 5 is not formed are illustrated. In a state before the adjustment portion 5 is formed, the first and second compensation electrodes 48A and 49A are line symmetric with respect to the imaginary straight line αx.

In the adjustment portion 5, the electrode fingers 491A and 493A are subjected to laser processing. In the configuration illustrated in the drawing, the upper ends of the electrode fingers 491A and 493A are shaved and rounded by laser processing to form a concave notch. By setting the wavelength of the laser beam to about 350 to 1100 nm, the upper ends of the electrode fingers 491A and 493A made of silicon material can be removed and surfaces of the upper ends can be processed into a round shape. For that reason, as illustrated in FIG. 10, a thickness t1 of the electrode fingers 491A and 493A is thinner than a thickness t2 (=t) of the electrode fingers 481A and 483A. Accordingly, a facing area between adjacent electrode fingers 491A and 493A is smaller than a facing area between adjacent electrode fingers 481A and 483A, and the electrostatic attraction force E2 is correspondingly smaller than the electrostatic attraction force E1. Since the upper ends of the electrode fingers 491A and 493A are shaved and rounded, an average separation distance D1 between the adjacent electrode fingers 491A and 493A is larger than an average separation distance D2 between the adjacent electrode fingers 481A and 483A, and the electrostatic attraction force E2 is correspondingly smaller than the electrostatic attraction force E1.

In FIG. 11, the first compensation electrode 48B in which the adjustment portion 5 is formed and the second compensation electrode 49B in which the adjustment portion 5 is not formed are illustrated. In a state before the adjustment portion 5 is formed, the first and second compensation electrodes 48B and 49B are line symmetric with respect to the imaginary straight line αx.

In the adjustment portion 5, the electrode fingers 481B and 483B are subjected to laser processing in the same manner as the electrode fingers 491A and 493A described above. For that reason, as illustrated in FIG. 12, the thickness t1 of the electrode fingers 481B and 483B is thinner than the thickness t2 (=t) of the electrode fingers 491B and 493B. Accordingly, a facing area between adjacent electrode fingers 481B and 483B is smaller than a facing area between adjacent electrode fingers 491B and 493B, and the electrostatic attraction force E3 is correspondingly smaller than the electrostatic attraction force E4. Furthermore, since the upper ends of the electrode fingers 481B and 483B are shaved and rounded, an average separation distance D3 between the adjacent electrode fingers 481B and 483B is larger than an average separation distance D4 between the adjacent electrode fingers 491B and 493B, and the electrostatic attraction force E3 is correspondingly smaller than the electrostatic attraction force E4.

In this way, by forming the adjustment portion 5 on the second compensation electrode 49A and the first compensation electrode 48B and making the electrostatic attraction forces E2 and E3 smaller than the electrostatic attraction forces E1 and E4 of the first compensation electrodes 48A and second compensation electrodes 49B where the adjustment portion 5 is not formed, the difference ΔE increases compared with the case where the adjustment portion 5 is not formed, and as a result, the maximum value of the force Fc that can be applied to the movable bodies 40A and 40B increases. For that reason, according to the inertial sensor 1, even a relatively large quadrature that cannot be canceled without the adjustment portion 5 can be effectively canceled.

In particular, in the first embodiment, as described above, the adjustment portion 5 is formed on the second compensation electrode 49A and the first compensation electrode 48B that are disposed symmetrically with respect to the center O. For that reason, the quadrature can be suppressed in both the movable bodies 40A and 40B, and the quadrature can be suppressed more effectively and in a well-balanced manner.

Figure 13:
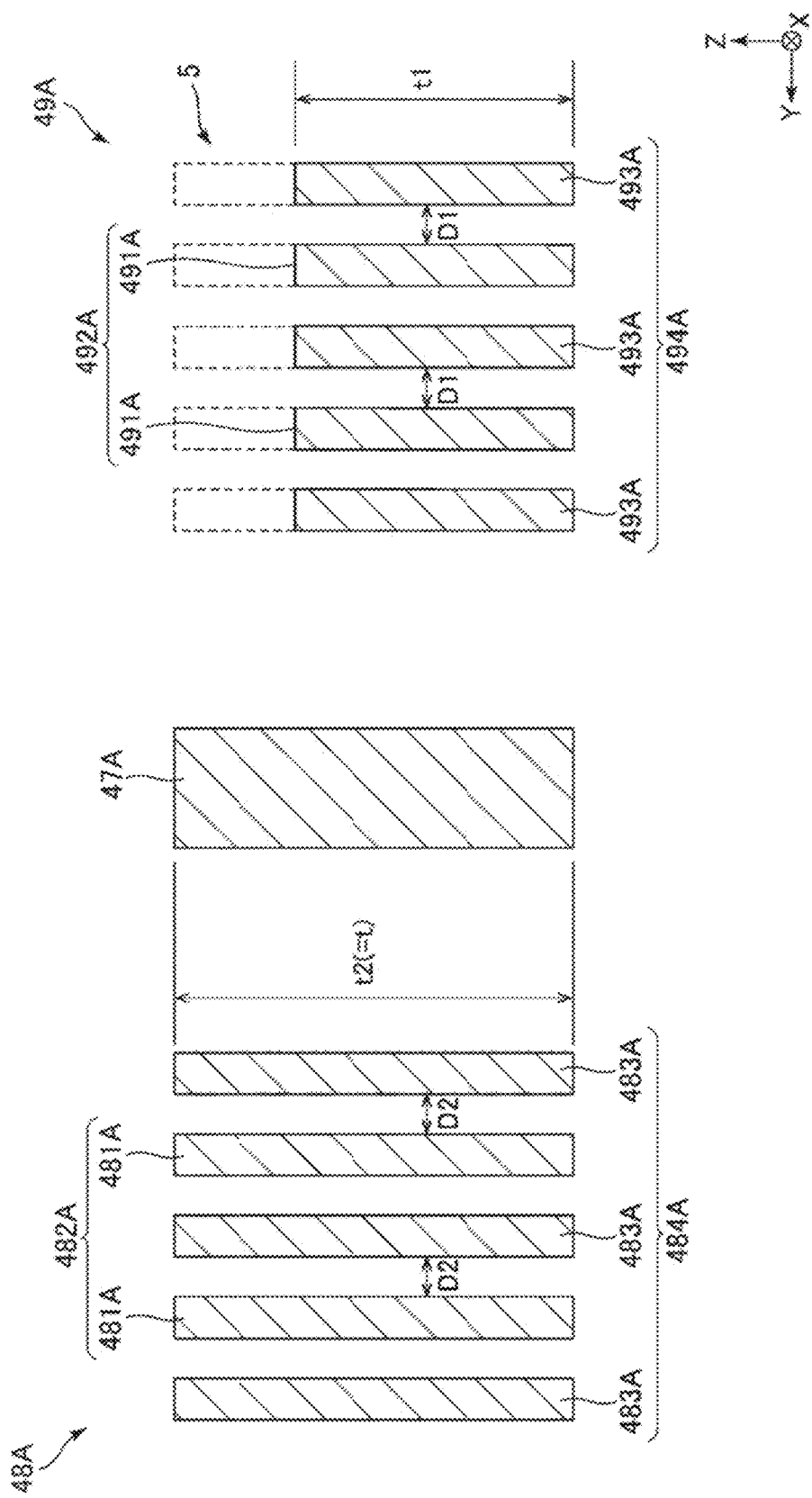
FIG. 13 is a cross-sectional view illustrating a modification example of the adjustment portion.
Figure 14:
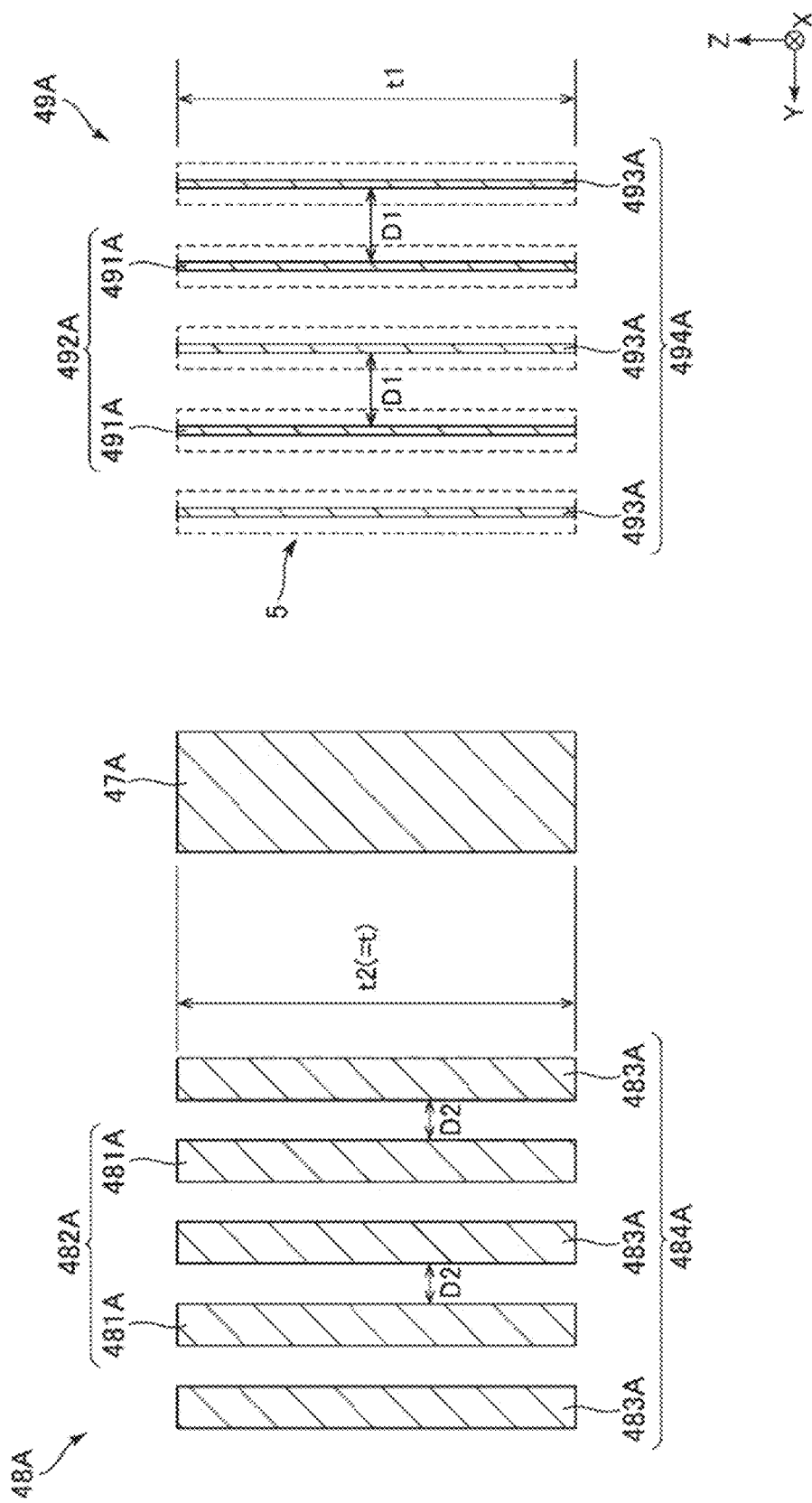
FIG. 14 is a cross-sectional view illustrating another modification example of the adjustment portion.
Figure 15:
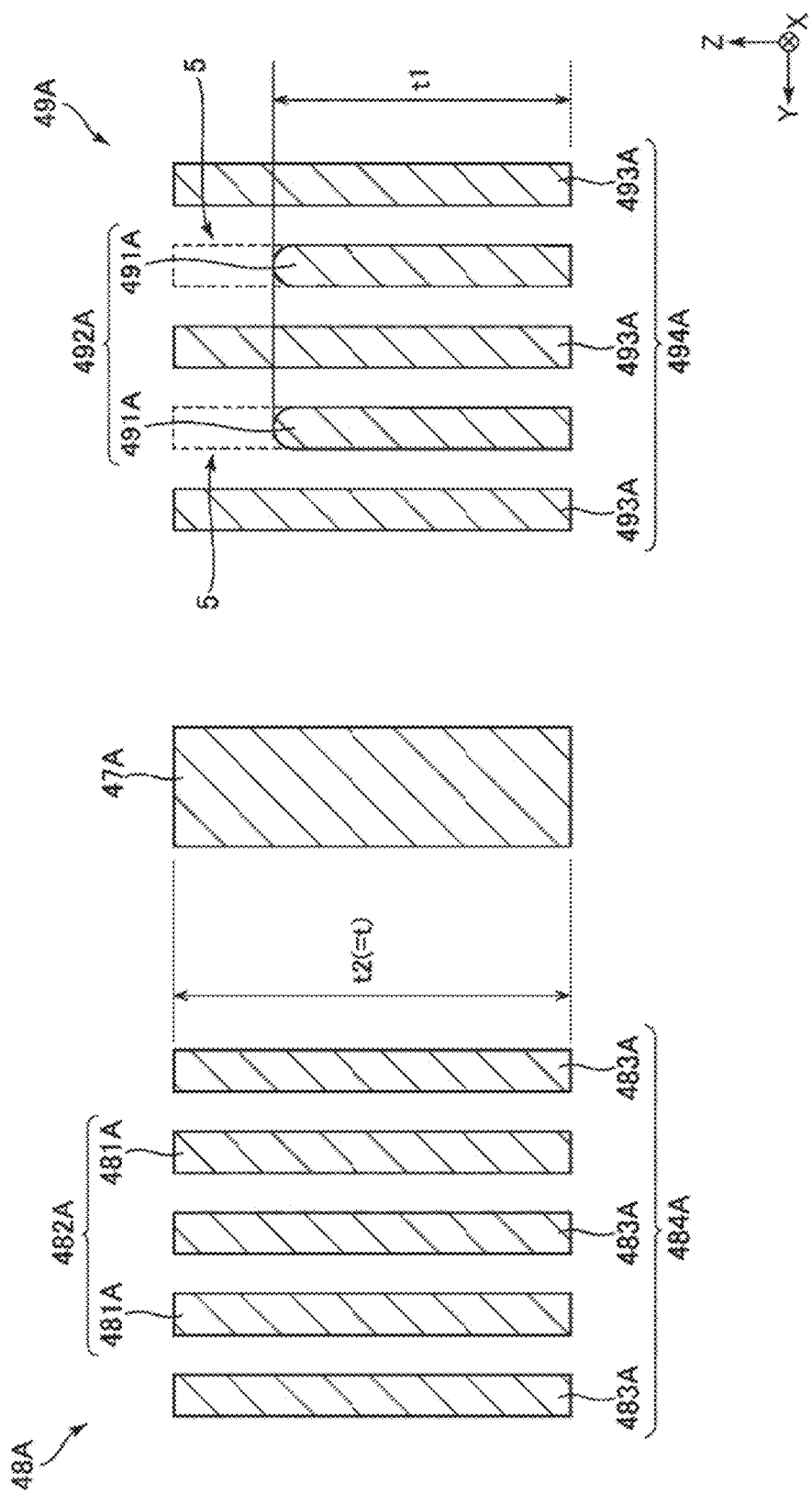
FIG. 15 is a cross-sectional view illustrating another modification of the adjustment portion.
Figure 16:
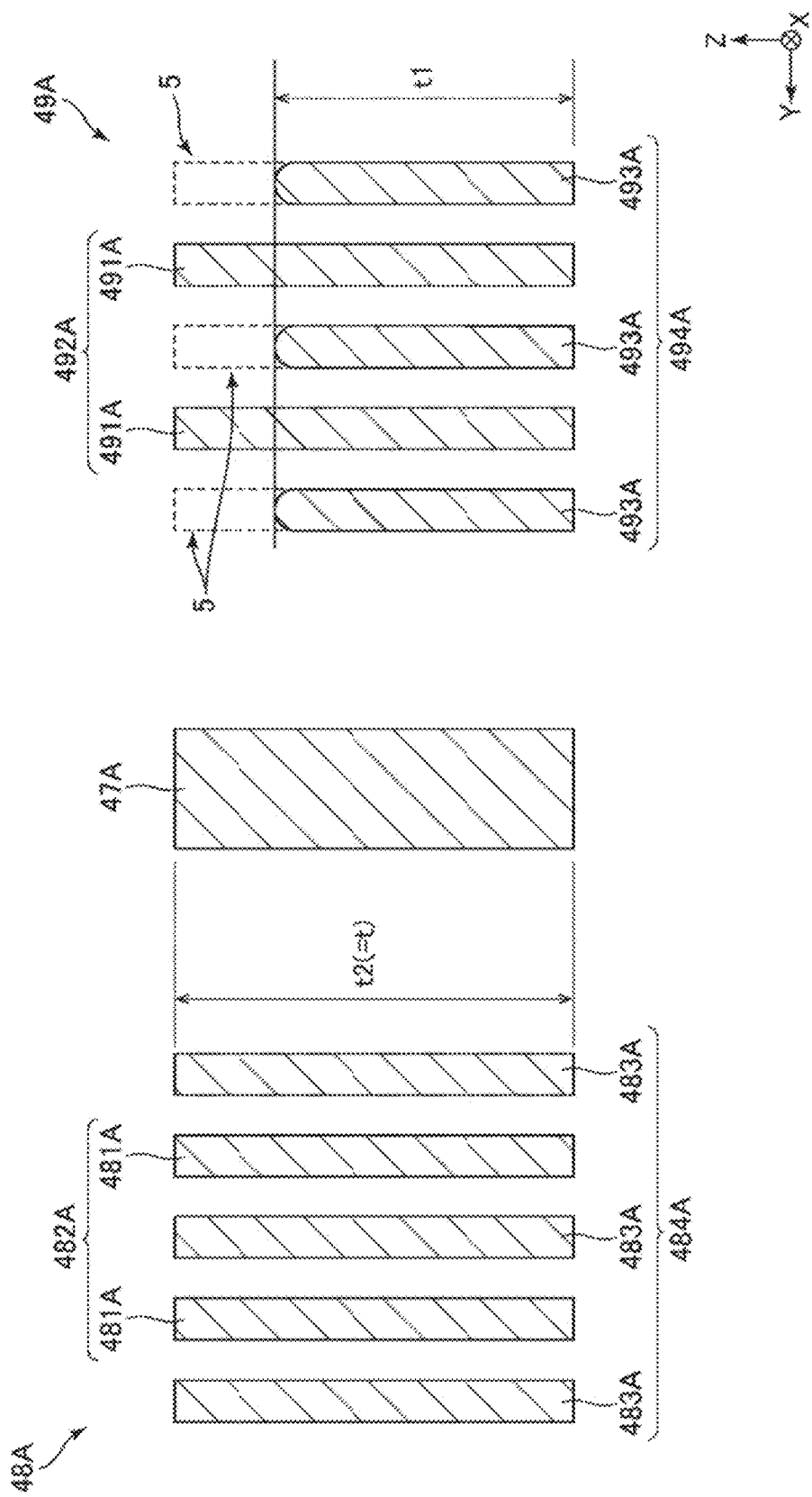
FIG. 16 is a cross-sectional view illustrating another modification of the adjustment portion.

The configuration of the adjustment portion 5 is not particularly limited. For example, in the first embodiment, the adjustment portion 5 is formed in a part of the electrode fingers 491A and 493A in the length direction, but is not limited thereto, and the adjustment portion 5 may be formed in the whole area in the length direction. As illustrated in FIG. 13, a configuration in which the thickness t1 of the electrode fingers 491A and 493A is thinner than the thickness t2 of the electrode fingers 481A and 483A, and the average separation distance D1 between the electrode fingers 491A and 493A is equal to the average separation distance D2 between the electrode fingers 481A and 483A may be adopted. For example, as illustrated in FIG. 14, a configuration in which the thickness t1 of the electrode fingers 491A and 493A is equal to the thickness t2 of the electrode fingers 481A and 483A and the average separation distance D1 between the electrode fingers 491A and 493A is larger than the average separation distance D2 between the electrode fingers 481A and 483A may also be adopted. In this case, the width of the electrode fingers 491A and 493A may be reduced by laser processing. The adjustment portion 5 may be formed only on the movable electrode finger 491A as illustrated in FIG. 15, or may be formed only on the fixed electrode finger 493A as illustrated in FIG. 16. The same applies to the first compensation electrode 48B.

In the first embodiment, the adjustment portion 5 is formed by laser processing, but, the method of forming the adjustment portion 5 is not limited to laser processing. For example, the adjustment portion 5 may be formed by focused ion beam processing, may be formed by etching, or may be formed by half-cutting with a dicing saw or the like.

The inertial sensor 1 has been described as above. As described above, when assuming that the three axes orthogonal to each other are the X-axis, the Y-axis, and the Z-axis, the inertial sensor 1 includes the substrate 2 and the structure 4A disposed on the substrate 2. The structure 4A includes the detection movable body 440A which overlaps the substrate 2 in a direction along the Z-axis and includes the movable detection electrode 442A, the detection spring 432A that supports the detection movable body 440A, the drive portion 41A that drives the detection movable body 440A in the direction along the X-axis with respect to the substrate 2, the fixed detection electrodes 443A and 444A fixed to the substrate 2 and facing the movable detection electrode 442A, the first compensation electrode 48A for applying the electrostatic attraction force E1 which has the component E1y on the plus side in the Y-axis direction which is a first direction component different from the direction along the X-axis to the detection movable body 440A, and the second compensation electrode 49A for applying the electrostatic attraction force E2 which has the component E2y on the minus side in the Y-axis direction which is a second direction component opposite to the first direction component to the detection movable body 440A. One of the first compensation electrode 48A and the second compensation electrode 49A, that is, the second compensation electrode 49A in the first embodiment includes the adjustment portion 5 that adjusts the magnitude of the electrostatic attraction force E2. As such, by forming the adjustment portion 5 on one of the first and second compensation electrodes 48A and 49A, the difference ΔE becomes larger than when the adjustment portion 5 is not formed as described above, and as a result, the maximum value of the force Fc that can be applied to the detection movable body 440A is increased. For that reason, according to the inertial sensor 1, even relatively large quadrature that cannot be canceled without the adjustment portion 5 can be effectively canceled. Thus, the inertial sensor 1 can reduce a decrease in inertia detection characteristics due to the quadrature.

As described above, the fixed detection electrodes 443A and 444A are disposed to face the movable detection electrode 442A in the direction along the Y-axis. The first direction component is a component toward the plus side in the direction along the Y-axis, and the second direction component is a component toward the minus side in the direction along the Y-axis. With this configuration, the angular velocity Oz around the Z-axis can be accurately detected.

As described above, each of the first compensation electrode 48A and the second compensation electrode 49A includes the comb-teeth shaped movable compensation electrodes 482A and 492A that are provided on the detection movable body 440A and include a plurality of movable electrode fingers 481A and 491A, and the comb-teeth shaped fixed compensation electrodes 484A and 494A that are fixed to the substrate 2 and include a plurality of fixed electrode fingers 483A and 493A disposed to be engaged with the movable compensation electrodes 482A and 492A. With this, a configuration of the first compensation electrode 48A and the second compensation electrode 49A is simplified.

As described above, in the first compensation electrode 48A and the second compensation electrode 49A, the average separation distance D1 between the movable electrode finger 491A and the fixed electrode finger 493A (in the first embodiment, the second compensation electrode 49A) that include the adjustment portion 5 is greater than the average separation distance D2 between the movable electrode finger 481A and the fixed electrode finger 483A (in the first embodiment, the first compensation electrode 48A) that do not include the adjustment portion 5. With this, it is possible to increase the difference ΔE with a simple configuration, as compared with the case where the adjustment portion 5 is not formed.

As described above, in the first compensation electrode 48A and the second compensation electrode 49A, the facing area between the movable electrode finger 491A and the fixed electrode finger 493A (in the first embodiment, the second compensation electrode 49A) that include the adjustment portion 5 is smaller than the facing area between the movable electrode finger 481A and the fixed electrode finger 483A (in the first embodiment, the first compensation electrode 48A) that do not include the adjustment portion 5. With this, it is possible to increase the difference ΔE with a simple configuration, as compared with the case where the adjustment portion 5 is not formed.

As described above, each of the first compensation electrode 48A and the second compensation electrode 49A is disposed between the detection movable body 440A and the drive portion 41A. With this configuration, the space between the detection movable body 440A and the drive portion 41A can be effectively used, and miniaturization of the inertial sensor 1 can be achieved.

As described above, the first compensation electrode 48A and the second compensation electrode 49A are disposed to be line symmetric with respect to the X-axis, more specifically with respect to the imaginary straight line αx. With this configuration, before the adjustment portion 5 is formed, the electrostatic attraction forces E1 and E2 are balanced, and thus adjustment of the force Fc can be easily performed by forming the adjustment portion 5 therefrom.

As described above, the inertial sensor 1 includes two structures 4A and 4B disposed side by side in the direction along the X-axis. The detection movable body 440A included in one structure 4A and the detection movable body 440B included in the other structure 4B vibrate in opposite phases in the direction along the X-axis. With this configuration, vibration of the detection movable bodies 440A and 440B is canceled, and the inertial sensor 1 with less vibration leakage is obtained.

As described above, two structures 4A and 4B are disposed to be line symmetric with respect to the Y-axis, more specifically, with respect to the imaginary straight line αy. The first compensation electrode 48B included in one structure 4B and the second compensation electrode 49A included in the other structure 4A have the adjustment portion 5. With this configuration, the quadrature can be suppressed in both of the detection movable bodies 440A and 440B, and the quadrature can be suppressed more effectively and in a well-balanced manner.

Second Embodiment

Figure 17:
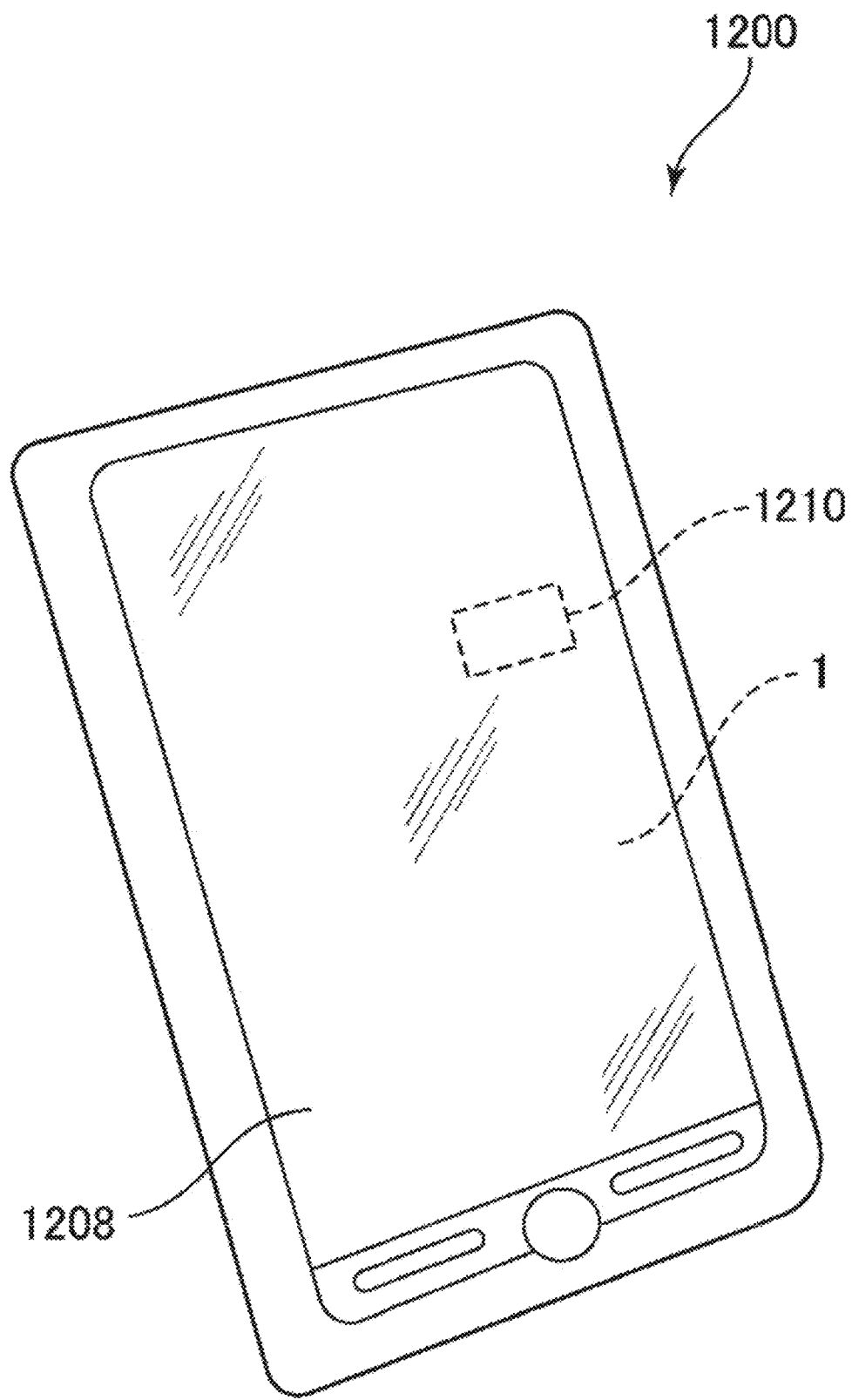
FIG. 17 is a plan view illustrating a smartphone according to a second embodiment.

FIG. 17 is a plan view illustrating a smartphone according to a second embodiment.

In the smartphone 1200 illustrated in FIG. 17, the inertial sensor 1 and a control circuit 1210 that performs control based on detection signals output from the inertial sensor 1 are incorporated. Detection data measured by the inertial sensor 1 is transmitted to the control circuit 1210, and the control circuit 1210 can recognize the attitude and behavior of the smartphone 1200 from the received detection data, change a display image displayed on a display unit 1208, generate an alarm sound or sound effect, or drive the vibration motor to vibrate the main body.

The smartphone 1200 as such an electronic device includes the inertial sensor 1. For that reason, the effect of the inertial sensor 1 described above can be obtained, and high reliability can be exhibited.

The electronic device incorporating the inertial sensor 1 is not particularly limited, and includes, for example, a personal computer, a digital still camera, a tablet terminal, a timepiece, a smartwatch, an ink jet printer, a laptop personal computer, a TV, a wearable terminals such as HMD (head mounted display), a video camera, a video tape recorder, a car navigation device, a pager, an electronic datebook, an electronic dictionary, a calculator, an electronic game machines, a word processor, a work station, a videophone, a security TV monitor, an electronic binoculars, a POS terminal, medical equipment, a fish finder, various measuring instruments, mobile terminal base station equipment, various instruments of vehicles, aircraft, and ships, a flight simulator, a network server, and the like, in addition to the smartphone 1200.

Third Embodiment

Figure 18:
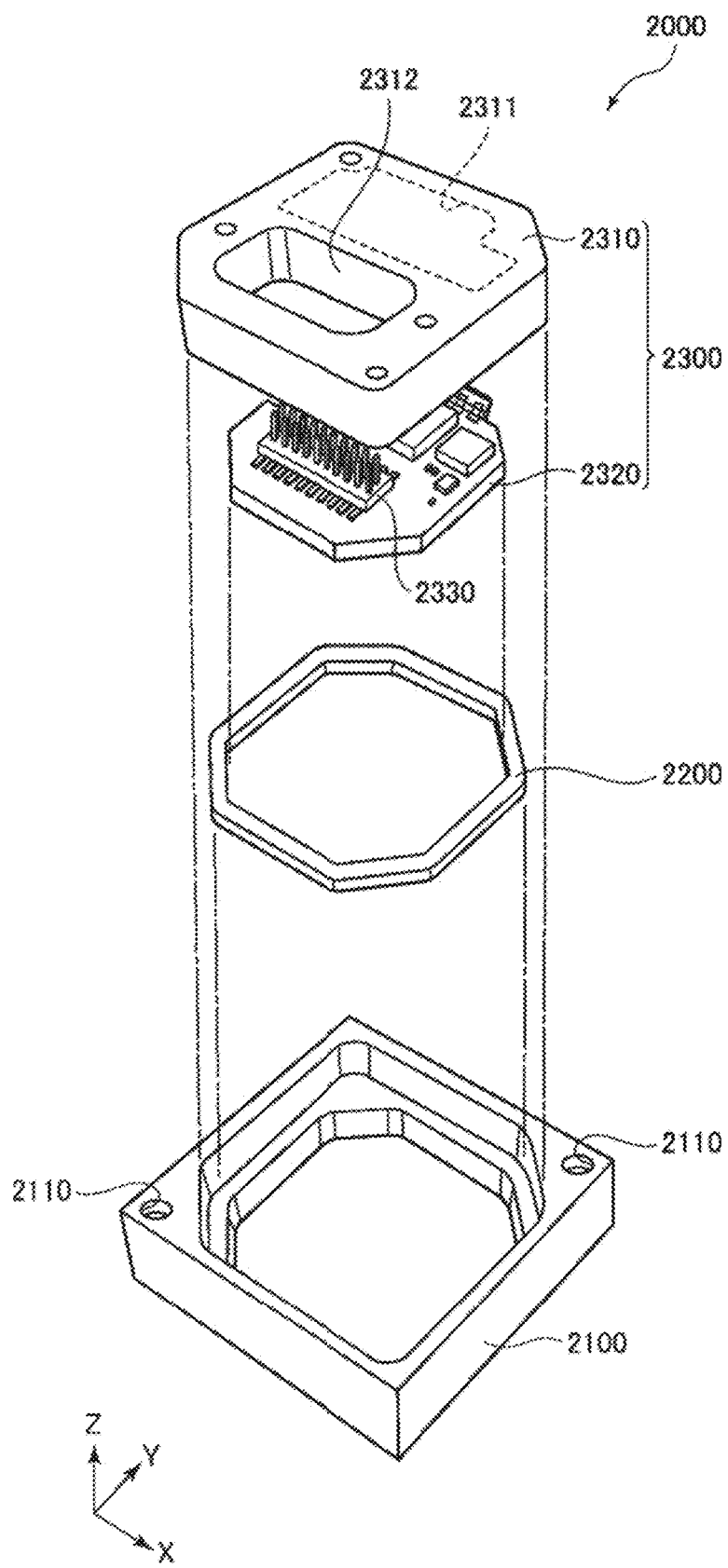
FIG. 18 is an exploded perspective view illustrating an inertia measurement device according to a third embodiment.
Figure 19:
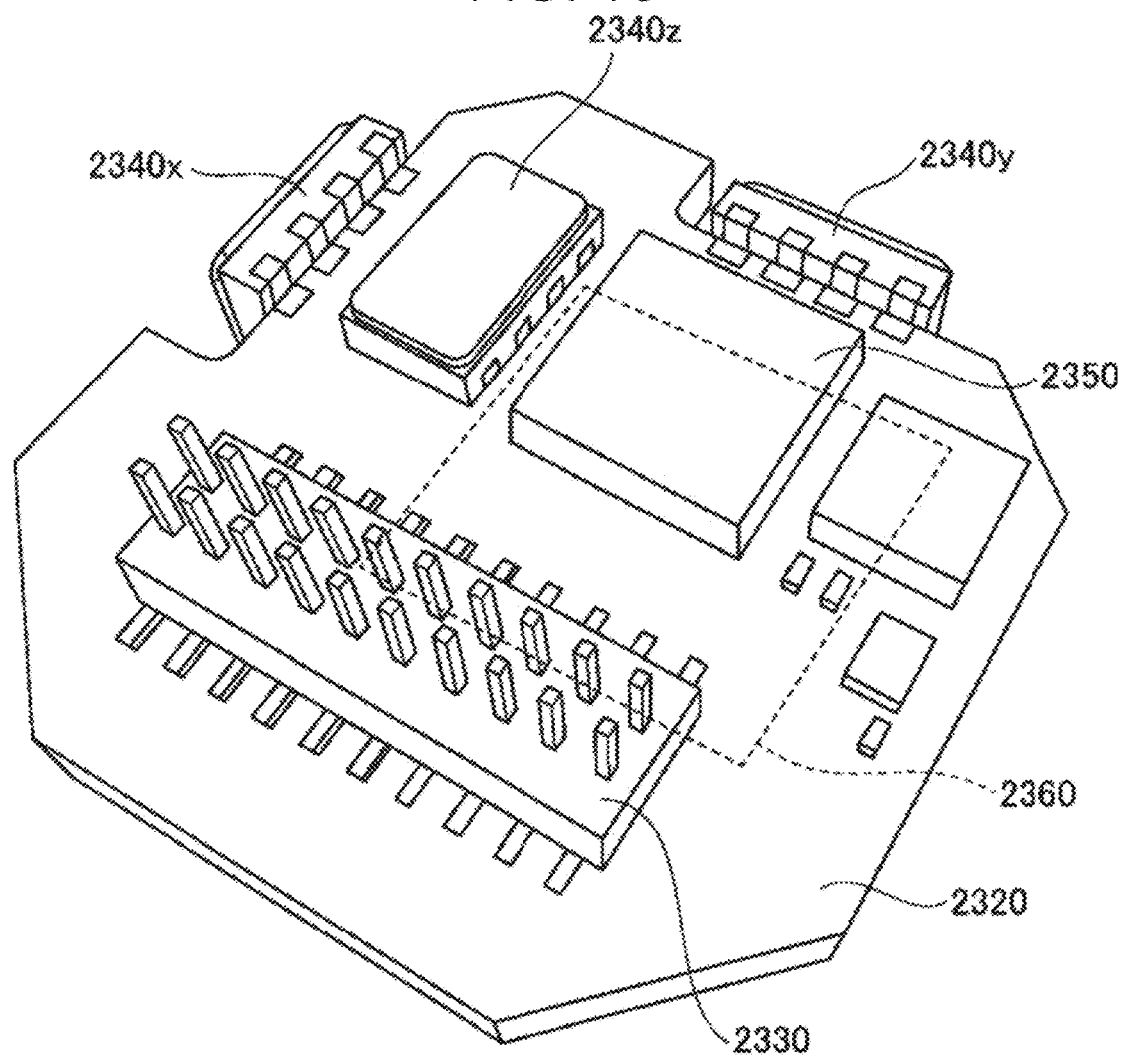
FIG. 19 is a perspective view of a substrate included in the inertia measurement device illustrated in FIG. 18.

FIG. 18 is an exploded perspective view illustrating an inertia measurement device according to a sixth embodiment. FIG. 19 is a perspective view of a substrate included in the inertia measurement device illustrated in FIG. 18.

An inertia measurement device 2000 (IMU: Inertial measurement Unit) illustrated in FIG. 18 is an inertia measurement device that detects the attitude and behavior of a mounted device such as an automobile or a robot. The inertia measurement device 2000 functions as a six-axis motion sensor including three-axis acceleration sensors and three-axis angular velocity sensors.

The inertia measurement device 2000 is a rectangular parallelepiped having a substantially square planar shape. Screw holes 2110 as fixed portions are formed in the vicinity of two vertices positioned in the diagonal direction of the square. Through two screws in the two screw holes 2110, the inertia measurement device 2000 can be fixed to the mounted surface of the mounted object such as an automobile. The size of the inertia measurement device 2000 can be reduced such that the device can be mounted on a smartphone or a digital camera, for example, by selection of parts or design change.

The inertia measurement device 2000 has a configuration in which an outer case 2100, a bonding member 2200, and a sensor module 2300 are included and the sensor module 2300 is inserted in the outer case 2100 with the bonding member 2200 interposed therebetween. Similarly to the overall shape of the inertia measurement device 2000 described above, the outer shape of the outer case 2100 is a rectangular parallelepiped having a substantially square planar shape, and screw holes 2110 are formed in the vicinity of two vertices positioned in the diagonal direction of the square. In addition, the outer case 2100 has a box shape and the sensor module 2300 is accommodated therein.

Further, the sensor module 2300 includes an inner case 2310 and a substrate 2320. The inner case 2310 is a member for supporting the substrate 2320, and has a shape that fits inside the outer case 2100. A concave portion 2311 for reducing the possibility of contact with the substrate 2320 and an opening 2312 for exposing a connector 2330 described later are formed in the inner case 2310. Such an inner case 2310 is bonded to the outer case 2100 through the bonding member 2200. The substrate 2320 is bonded to the lower surface of the inner case 2310 through an adhesive.

As illustrated in FIG. 19, a connector 2330, an angular velocity sensor 2340z for measuring the angular velocity around the Z-axis, an acceleration sensor 2350 for measuring acceleration in each axis direction of the X-axis, the Y-axis, and the Z-axis and the like are mounted on the upper surface of the substrate 2320. An angular velocity sensor 2340x for measuring the angular velocity around the X-axis and an angular velocity sensor 2340y for measuring the angular velocity around the Y-axis are mounted on the side surface of the substrate 2320. As these sensors, the inertial sensor of the present disclosure can be used.

A control IC 2360 is mounted on the lower surface of the substrate 2320. The control IC 2360 is a micro controller unit (MCU) and controls each unit of the inertia measurement device 2000. In the storing unit, programs defining the order and contents for measuring the acceleration and angular velocity, programs for digitizing detected data and incorporating the detected data into packet data, accompanying data, and the like are stored. In addition, a plurality of electronic components are mounted on the substrate 2320.

Fourth Embodiment

Figure 20:
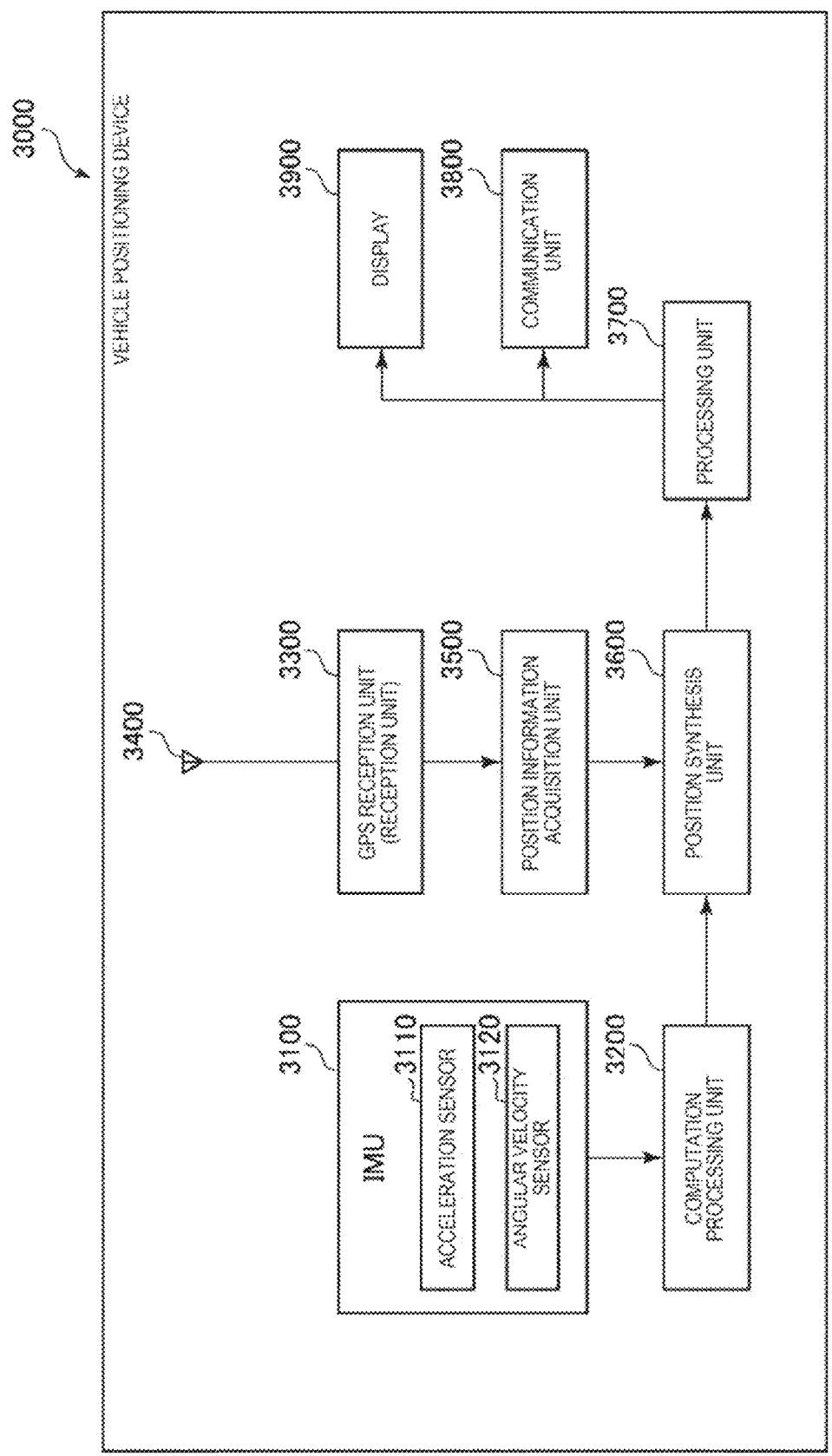
FIG. 20 is a block diagram illustrating the entire system of a vehicle positioning device according to a fourth embodiment.
Figure 21:
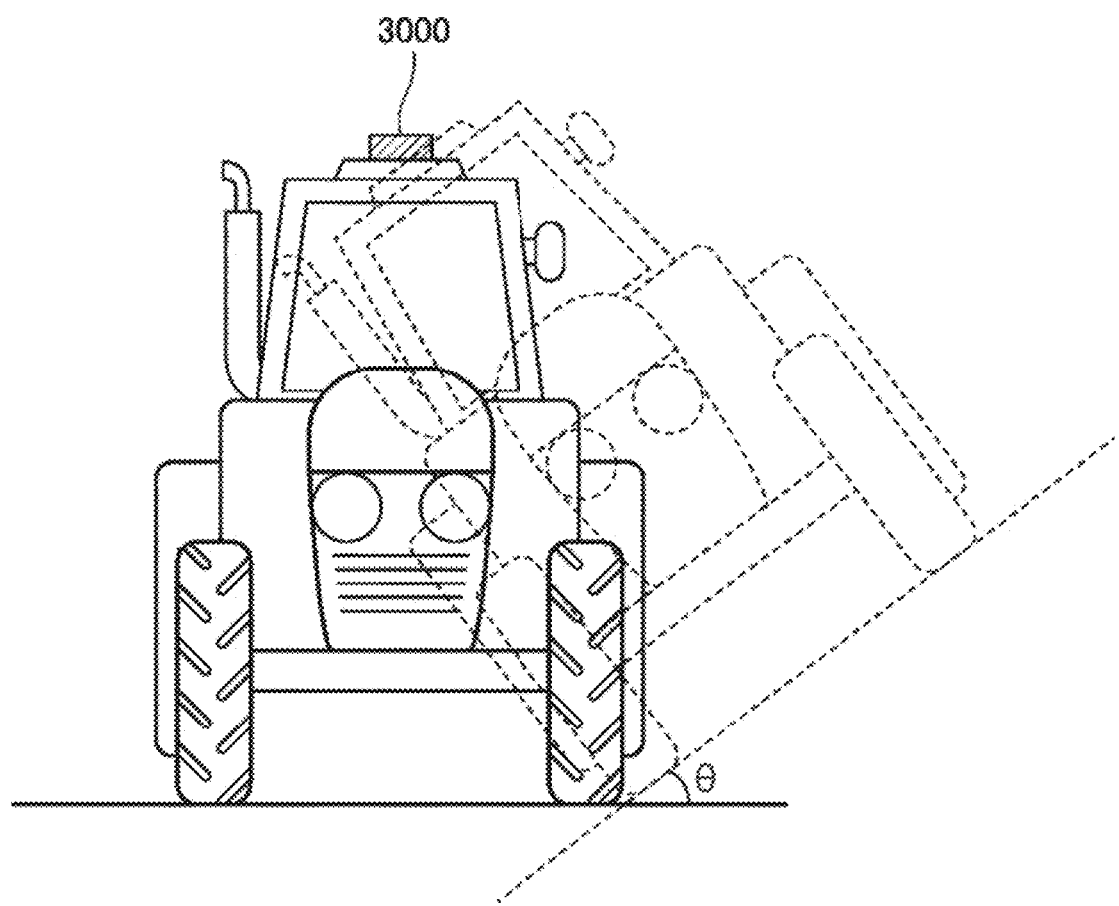
FIG. 21 is a diagram illustrating an action of the vehicle positioning device illustrated in FIG. 20.

FIG. 20 is a block diagram illustrating the entire system of a vehicle positioning device according to a fourth embodiment. FIG. 21 is a diagram illustrating the operation of the vehicle positioning device illustrated in FIG. 20.

A vehicle positioning device 3000 illustrated in FIG. 20 is a device which is used by being mounted on a vehicle and performs positioning of the vehicle. The vehicle is not particularly limited, and may be any of a bicycle, an automobile, a motorcycle, a train, an airplane, a ship, and the like, but in the fourth embodiment, description will be made on a four-wheeled automobile as the vehicle.

The vehicle positioning device 3000 includes an inertia measurement device 3100 (IMU), a computation processing unit 3200, a GPS reception unit 3300, a receiving antenna 3400, a position information acquisition unit 3500, a position synthesis unit 3600, a processing unit 3700, a communication unit 3800, and a display 3900. As the inertia measurement device 3100, for example, the inertia measurement device 2000 described above can be used.

The inertia measurement device 3100 includes a tri-axis acceleration sensor 3110 and a tri-axis angular velocity sensor 3120. The computation processing unit 3200 receives acceleration data from the acceleration sensor 3110 and angular velocity data from the angular velocity sensor 3120, performs inertial navigation computation processing on these data, and outputs inertial navigation positioning data including acceleration and attitude of the vehicle.

The GPS reception unit 3300 receives a signal from the GPS satellite through the receiving antenna 3400. Further, the position information acquisition unit 3500 outputs GPS positioning data representing the position (latitude, longitude, altitude), speed, direction of the vehicle positioning device 3000 based on the signal received by the GPS reception unit 3300. The GPS positioning data also includes status data indicating a reception state, a reception time, and the like.

Based on inertial navigation positioning data output from the computation processing unit 3200 and the GPS positioning data output from the position information acquisition unit 3500, the position synthesis unit 3600 calculates the position of the vehicle, more specifically, the position on the ground where the vehicle is traveling. For example, even if the position of the vehicle included in the GPS positioning data is the same, as illustrated in FIG. 21, if the attitude of the vehicle is different due to the influence of inclination θ of the ground or the like, the vehicle is traveling at different positions on the ground. For that reason, it is impossible to calculate an accurate position of the vehicle with only GPS positioning data. Therefore, the position synthesis unit 3600 calculates the position on the ground where the vehicle is traveling, using inertial navigation positioning data.

The position data output from the position synthesis unit 3600 is subjected to predetermined processing by the processing unit 3700 and displayed on the display 3900 as a positioning result. Further, the position data may be transmitted to the external apparatus by the communication unit 3800.

Fifth Embodiment

Figure 22:
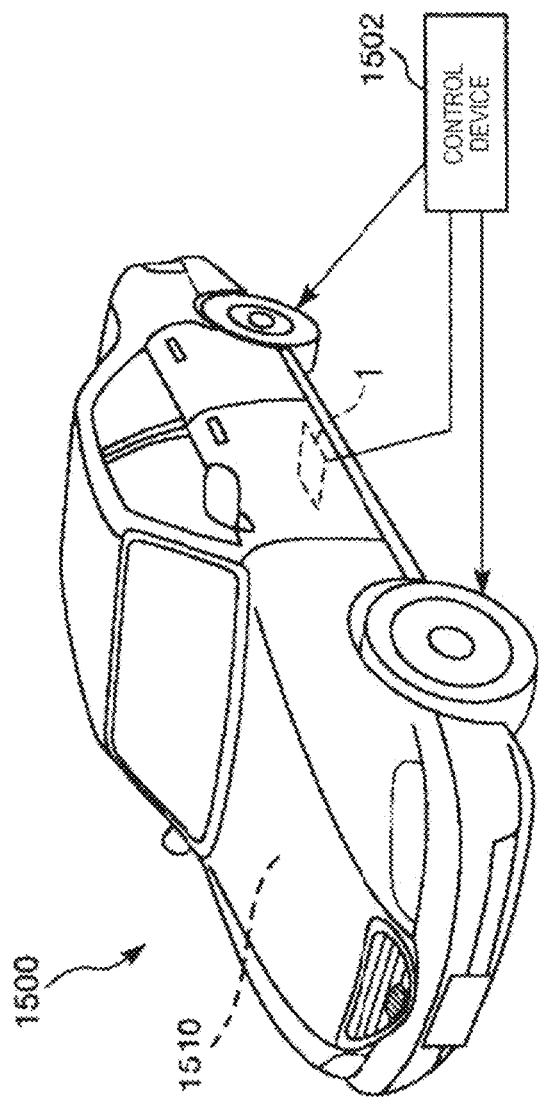
FIG. 22 is a perspective view illustrating a vehicle according to a fifth embodiment.

FIG. 22 is a perspective view illustrating a vehicle according to a fifth embodiment of the present disclosure.

An automobile 1500 as the vehicle illustrated in FIG. 22 is an automobile includes at least one system 1510 of an engine system, a brake system, and a keyless entry system. The inertial sensor 1 is incorporated in the automobile 1500, and the attitude of the vehicle body can be measured by the inertial sensor 1. The detection signal of the inertial sensor 1 is supplied to the control device 1502, and the control device 1502 can control the system 1510 based on the signal. As such, the automobile 1500 as the vehicle includes the inertial sensor 1. For that reason, the effect of the inertial sensor 1 described above can be obtained and high reliability can be exhibited.

In addition, the inertial sensor 1 can also be widely applied to a car navigation system, a car air conditioner, an anti-lock braking system (ABS), an air bag, a tire pressure monitoring system (TPMS), an engine controller, and an electronic control unit (ECU) such as a battery monitor of a hybrid car or an electric automobile. Also, the vehicle is not limited to the automobile 1500, but can also be applied to an airplane, a rocket, a satellite, a ship, an automated guided vehicle (AGV), a biped walking robot, an unmanned airplane such as a drone, and the like.

Although the inertial sensor of the present disclosure, the electronic device, and the vehicle of the present disclosure have been described based on the embodiments, the present disclosure is not limited thereto. The configuration of each unit can be replaced with any configuration having the same function. In addition, any other constituent elements may be added to the present disclosure. Further, the embodiments described above may be appropriately combined.

In the embodiments described above, the configuration in which the inertial sensor 1 measures the angular velocity (Oz around the Z-axis has been described, but is not limited thereto, and, for example, a configuration in which the angular velocity around the Y-axis is detected may be adopted. In this case, the vibration in the Z-axis direction of the movable bodies 40A and 40B in the drive vibration mode becomes the quadrature and adversely affects the detection characteristics, and thus the first and second compensation electrodes 48A, 49A, 48B, and 49B may be disposed so that the quadrature in the Z-axis direction can be suppressed.

In the embodiments described above, the sensor element 4 includes two movable bodies 40A and 40B, but is not limited to thereto, and for example, one of the movable bodies 40A and 40B may be omitted. In the embodiments described above, the configuration for measuring the angular velocity as the inertial sensor has been described, but is not limited thereto, and for example, a configuration for measuring acceleration may be adopted.

What is claimed is:

1. An angular velocity sensor comprising:
   when the three axes orthogonal to each other are the X-axis, Y-axis, and Z-axis,
   a substrate including a first surface and a second surface that are orthogonal to a Z-axis direction along the Z-axis and are in a front-to-back relationship with each other,
   a drive portion arranged on the first surface of the substrate,
   a detection portion that is arranged alongside the drive portion along a X-axis direction along the X-axis on the first surface of the substrate and detects an angular velocity based on a change in capacitance,
   a beam arranged along the X-axis direction and connecting the drive portion and the detection portion,
   a first compensation electrode arranged between the driving portion and the detecting portion in a plan view along the Z-axis direction, and
   a second compensation electrode arranged between the driving portion and the detecting portion in a plan view along the Z-axis direction, wherein
   in a plan view along the Z-axis direction, the beam is arranged between the first compensation electrode and the second compensation electrode, and
   the first compensation electrode and the second compensation electrode are structurally asymmetric with respect to the beam.

2. The angular velocity sensor according to claim 1, wherein
   the first compensation electrode and the second compensation electrode are arranged line-symmetrically with respect to the beam in a plan view along the Z-axis direction.

3. The angular velocity sensor according to claim 1, wherein
   the first compensation electrode and the second compensation electrode are connected to the detection portion.

4. The angular velocity sensor according to claim 3, wherein
   the detection portion comprising:
   a detection movable body including a movable detection electrode, and
   a fixed detection electrode fixed to the first surface of the substrate and facing the movable detection electrode, wherein
   the first compensation electrode and the second compensation electrode are connected to the detection movable body.

5. The angular velocity sensor according to claim 4, wherein
   the first compensation electrode and the second compensation electrode respectively comprising:
   a movable compensation electrode including a plurality of movable electrode fingers, and
   a fixed compensation electrode including a plurality of fixed electrode fingers fixed to the first surface of the substrate and facing each of the plurality of movable electrode fingers.

6. The angular velocity sensor according to claim 5, wherein
   either the first compensation electrode or the second compensation electrode includes an adjustment portion.

7. The angular velocity sensor according to claim 6, wherein
   the adjustment portion is a concave portion provided in the movable electrode finger and the fixed electrode finger.

8. The angular velocity sensor according to claim 7, wherein
   the concave portion is formed by forming the movable electrode finger and the fixed electrode finger in a concave shape by a laser.

9. An inertial measurement unit comprising the angular velocity sensor according to claim 1.

10. An electronic device comprising the angular velocity sensor according to claim 1.

11. A vehicle comprising the angular velocity sensor according to claim 1.

* * * * *